US011485290B2

(12) United States Patent
Oji et al.

(10) Patent No.: US 11,485,290 B2
(45) Date of Patent: Nov. 1, 2022

(54) STEP DEVICE FOR VEHICLE

(71) Applicants: AISIN CORPORATION, Aichi (JP); TOYOTA SHATAI KABUSHIKI KAISHA, Kariya (JP)

(72) Inventors: Yoshihiro Oji, Kariya (JP); Keisuke Nomura, Kariya (JP); Shinji Kazama, Kariya (JP); Kazuhiro Hibi, Kariya (JP); Kazuhiro Ikeda, Kariya (JP)

(73) Assignees: AISIN CORPORATION, Kariya (JP); TOYOTA SHATAI KABUSHIKI KAISHA, Kariya (JP)

( * ) Notice: Subject to any disclaimer, the term of this patent is extended or adjusted under 35 U.S.C. 154(b) by 75 days.

(21) Appl. No.: 17/012,759

(22) Filed: Sep. 4, 2020

(65) Prior Publication Data
US 2021/0070228 A1   Mar. 11, 2021

(30) Foreign Application Priority Data

Sep. 9, 2019 (JP) .............................. JP2019-164026

(51) Int. Cl.
*B60R 3/02* (2006.01)
(52) U.S. Cl.
CPC ...................................... *B60R 3/02* (2013.01)
(58) Field of Classification Search
CPC ........................................................ B60R 3/02
See application file for complete search history.

(56) References Cited

U.S. PATENT DOCUMENTS

| 3,608,957 | A | * | 9/1971 | Maneck | ................... | B60R 3/02 296/146.1 |
| 2006/0255558 | A1 | * | 11/2006 | Okuyama | ................. | B60R 3/02 280/166 |
| 2008/0238019 | A1 | * | 10/2008 | Okada | .................. | B61D 23/025 280/166 |
| 2008/0238020 | A1 | * | 10/2008 | Okada | ...................... | B60R 3/02 280/166 |

FOREIGN PATENT DOCUMENTS

| CN | 107226031 A | 10/2017 |
| JP | 2007-269086 A | 10/2007 |

(Continued)

OTHER PUBLICATIONS

U.S. Appl. No. 17/012,414, filed Sep. 4, 2020, Oji, Y. et al.

(Continued)

*Primary Examiner* — Bryan A Evans
(74) *Attorney, Agent, or Firm* — Oblon, McClelland, Maier & Neustadt, L.L.P.

(57) ABSTRACT

A step device for a vehicle includes: a movable step supported under a door opening; a coupling member that, in a state of being supported by a sliding door, engages with the movable step to move the movable step in a vehicle width direction in conjunction with opening and closing of the sliding door; a support arm that has a first pivot-joint point relative to a vehicle body and a second pivot-joint point relative to the movable step, and supports the movable step toward an upper side; and a pressure bearing member that is provided at a position between the first pivot-joint point and the second pivot-joint point and bears the load of the support arm by coming into sliding contact with the support arm.

9 Claims, 41 Drawing Sheets

(56) References Cited

FOREIGN PATENT DOCUMENTS

| JP | 2019-137385 A | 8/2019 |
| JP | 2019-182325 A | 10/2019 |
| JP | 2020-82916 A | 6/2020 |
| JP | 2020-82917 A | 6/2020 |
| JP | 2020-83052 A | 6/2020 |

OTHER PUBLICATIONS

U.S. Appl. No. 17/012,354, filed Sep. 4, 2020, Oji, Y. et al.
U.S. Appl. No. 17/012,385, filed Sep. 4, 2020, Oji, Y. et al.
U.S. Appl. No. 17/012,502, filed Sep. 4, 2020, Oji, Y. et al.
Chinese Office Action issued in Chinese Patent Application No. 202010928235.2 dated Aug. 3, 2022.

\* cited by examiner

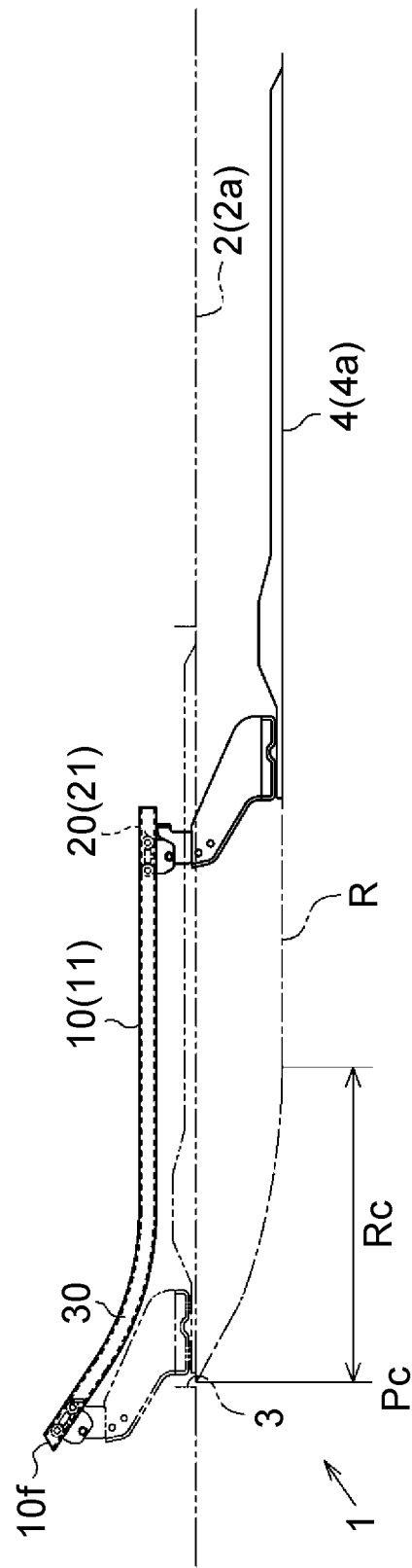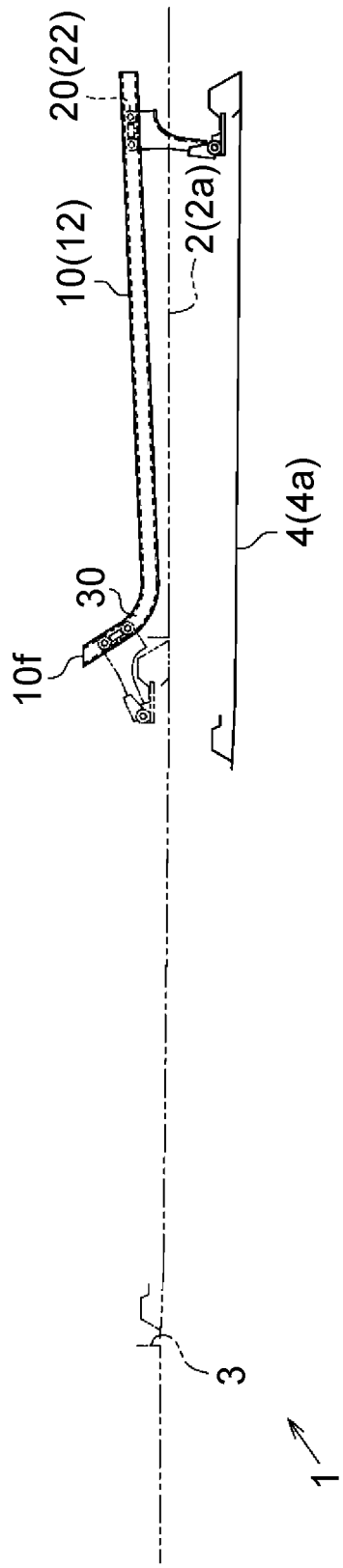

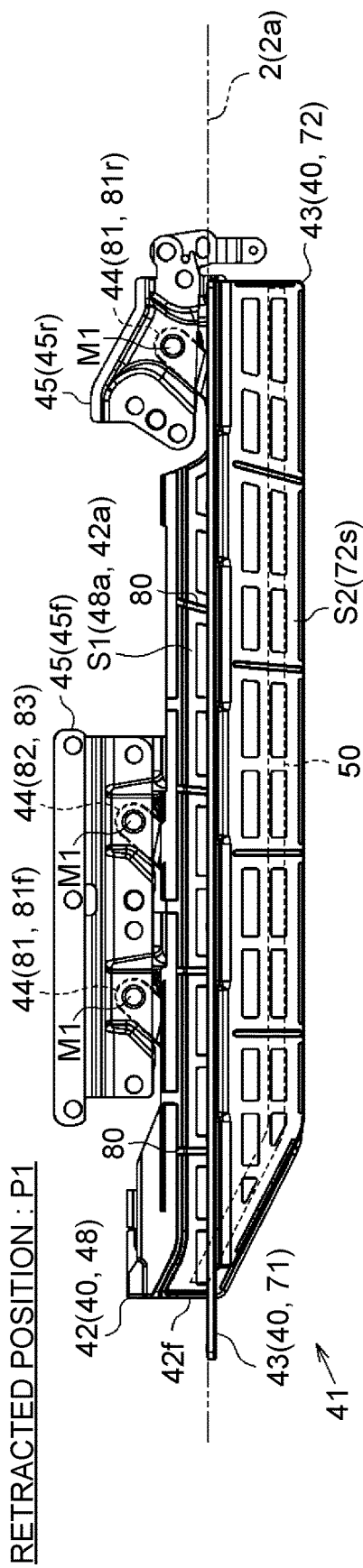
FIG. 4A   RETRACTED POSITION : P1
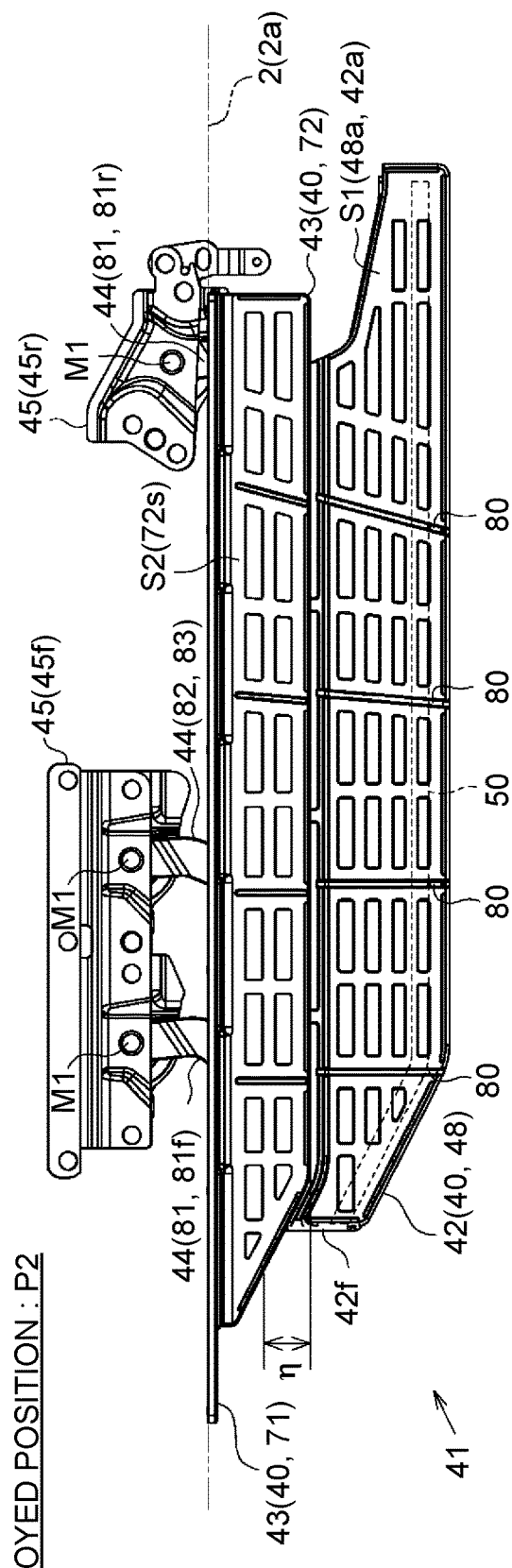
FIG. 4B   DEPLOYED POSITION : P2

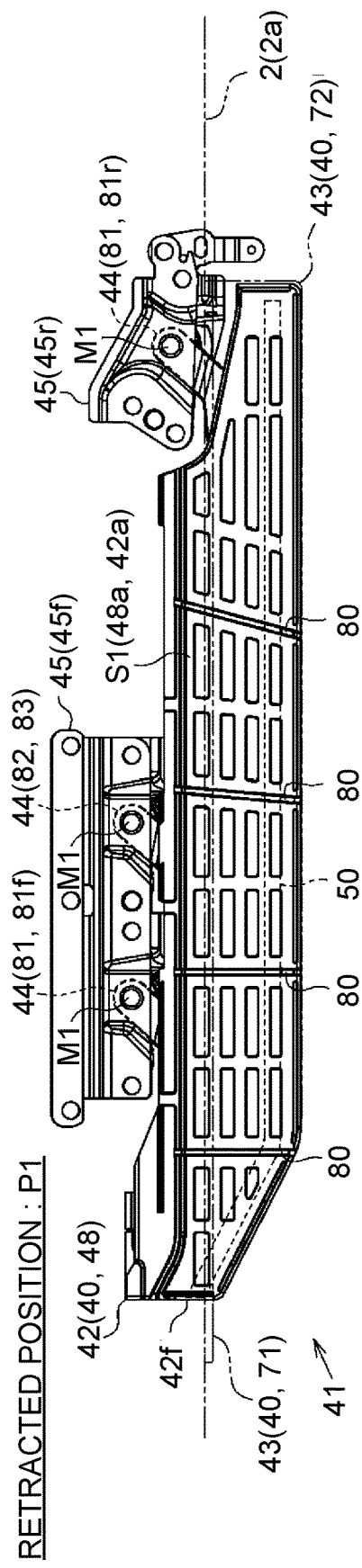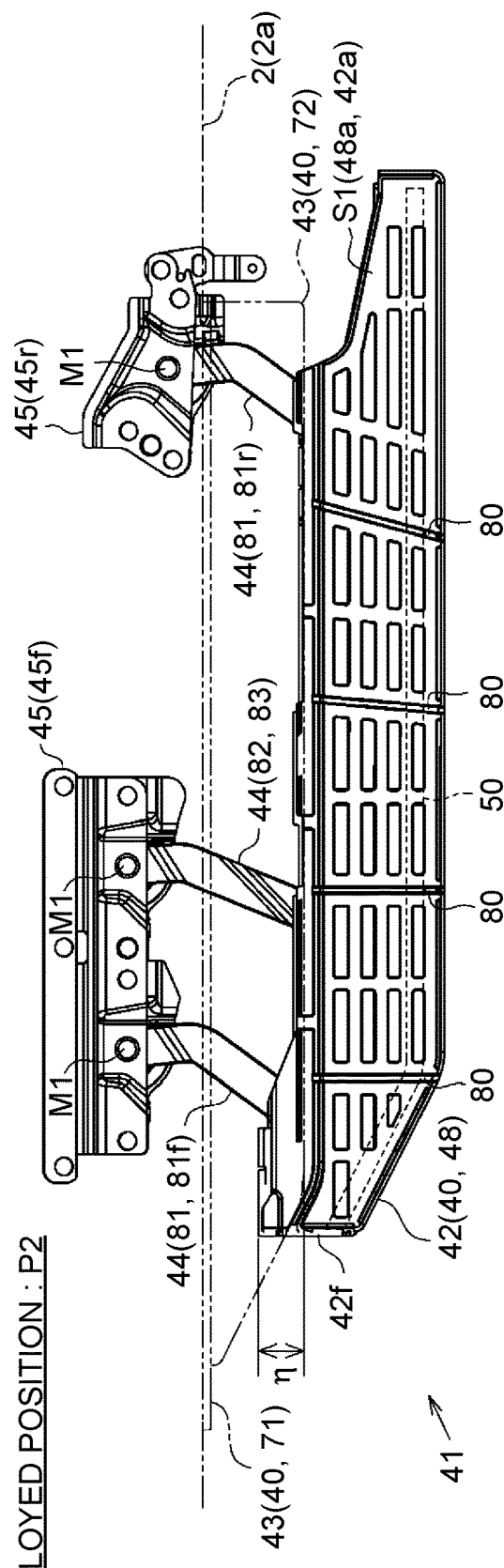

DURING OPENING IN CLOSING-SIDE FREE RUNNING ZONE $\theta r > \theta 1$

DURING MOVEMENT IN OPENING-SIDE FREE RUNNING ZONE

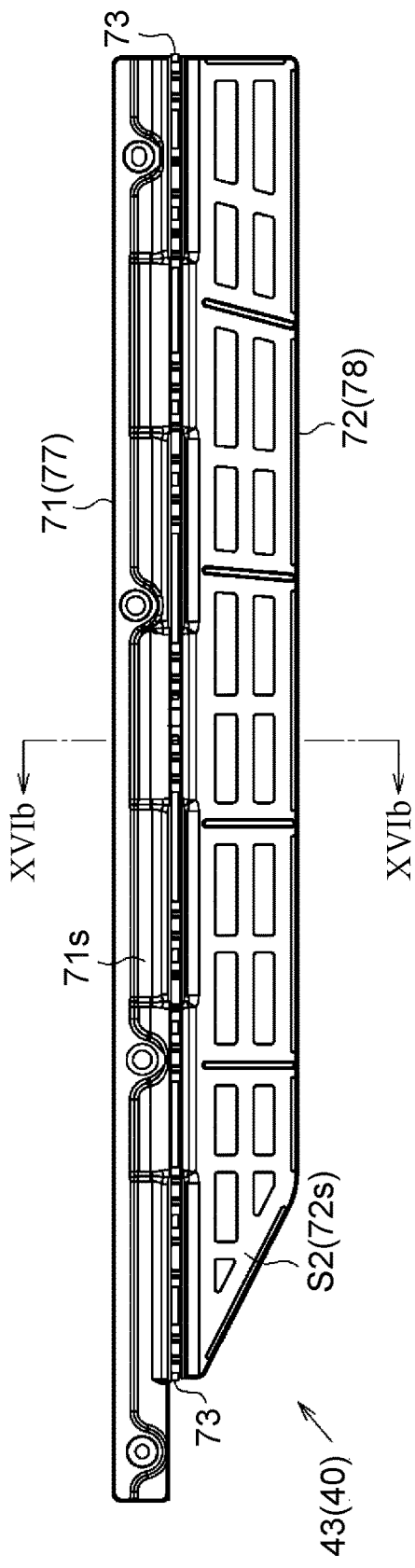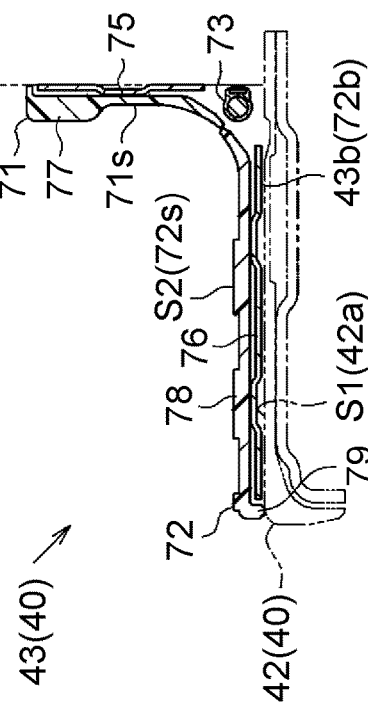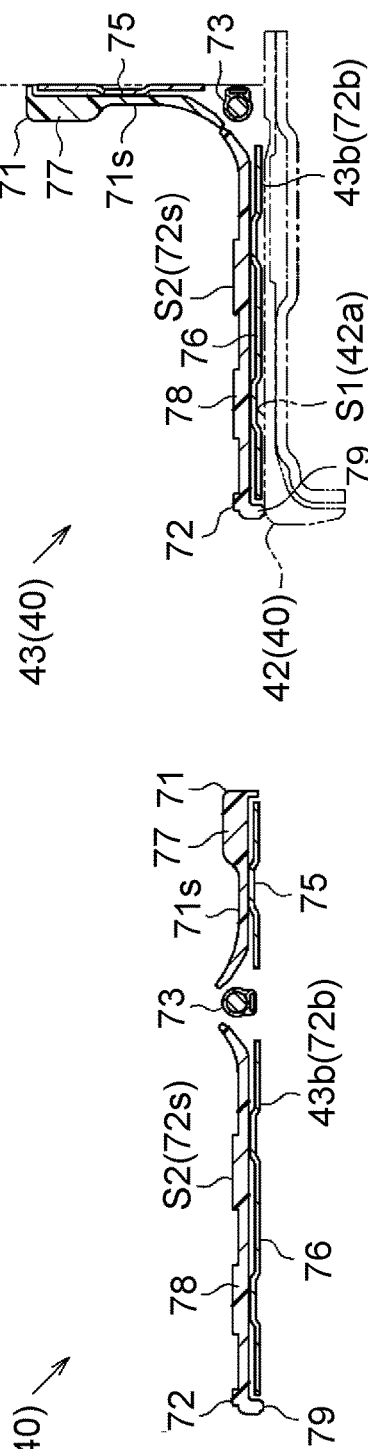

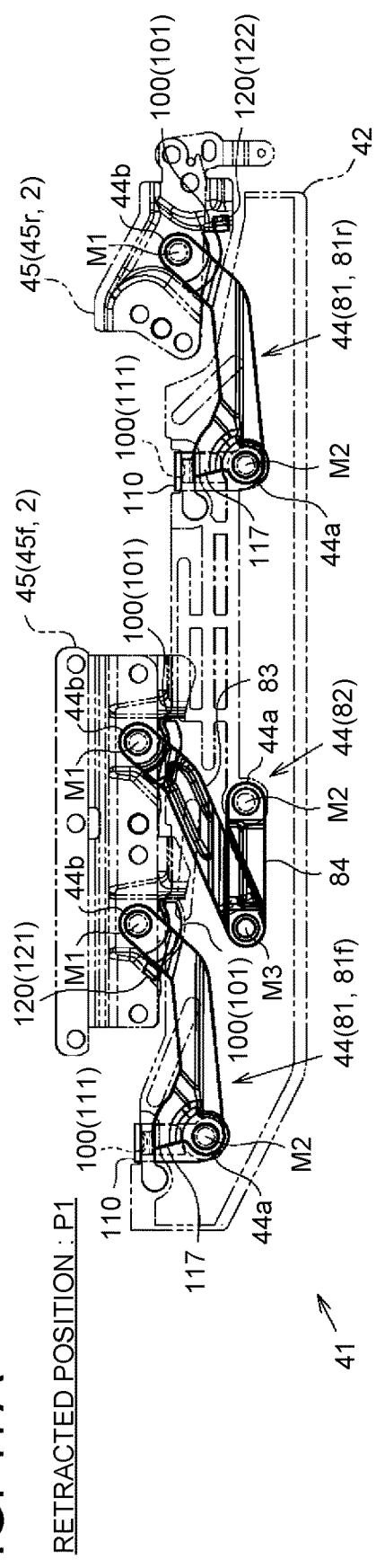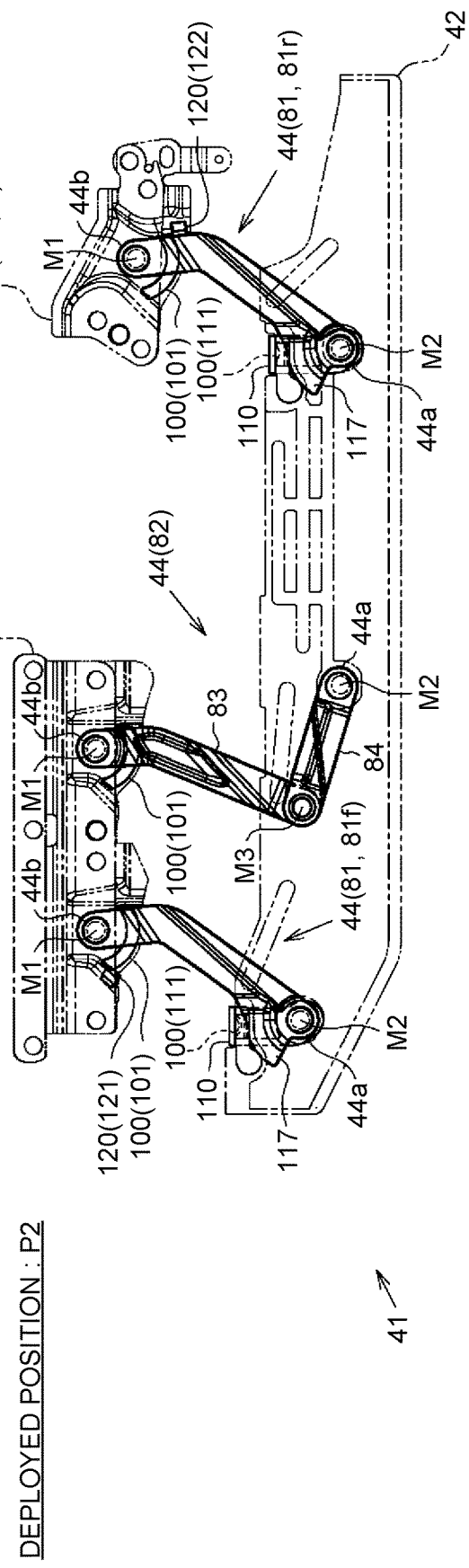

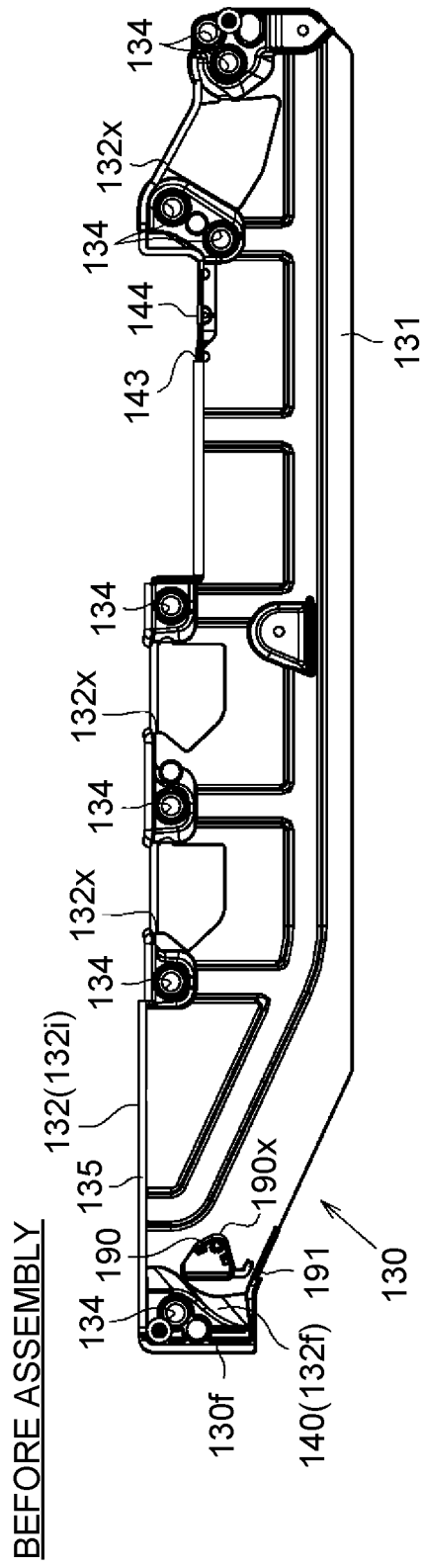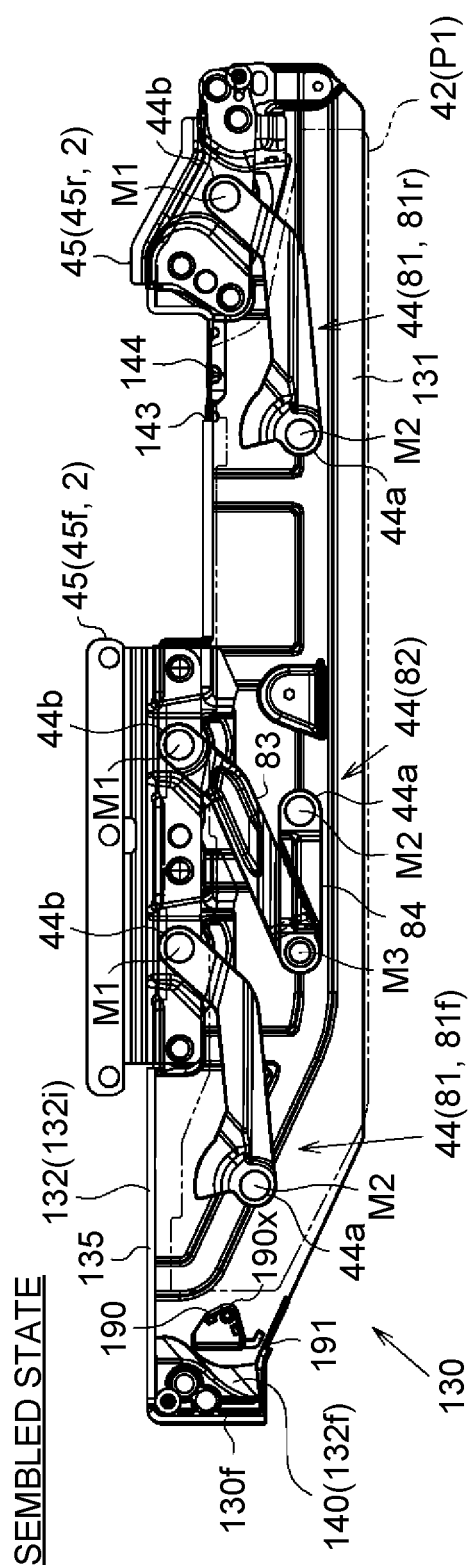

COUPLED STATE

UNCOUPLED STATE

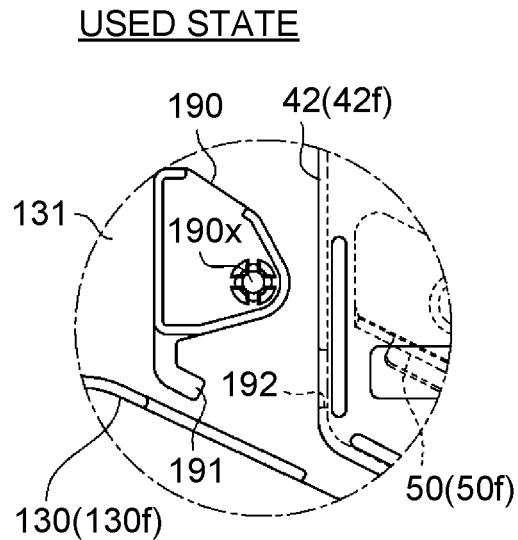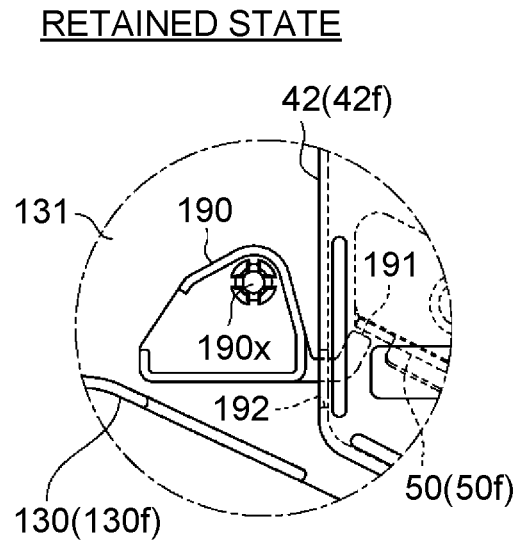
FIG. 39A
USED STATE
FIG. 39B
RETAINED STATE

STEP DEVICE FOR VEHICLE

CROSS-REFERENCE TO RELATED APPLICATION

This application claims priority to Japanese Patent Application No. 2019-164026 filed on Sep. 9, 2019, incorporated herein by reference in its entirety.

BACKGROUND

1. Technical Field

The present disclosure relates to a step device for a vehicle.

2. Description of Related Art

There are step devices for vehicles in which a movable step provided under a door opening is moved in a vehicle width direction in conjunction with opening and closing of a sliding door. For example, in the step device described in Japanese Patent Application Publication No. 2007-269086, a movable step is coupled to a sliding door through a guide member that is provided on a lower surface of the movable step and a coupling member that has a sliding member guided by the guide member. Thus, the movable step is moved to a deployed position on an outer side in a vehicle width direction in conjunction with the sliding door as the sliding door opens toward a vehicle rear side while shifting toward the outer side in the vehicle width direction, and is moved to a retracted position on an inner side in the vehicle width direction in conjunction with the sliding door as the sliding door closes toward a vehicle front side while shifting toward the inner side in the vehicle width direction.

In the step device shown in this example, the movable step is supported above a pair of parallel links that serve as support arms. These support arms are turned to move the movable step in the vehicle width direction.

SUMMARY

In a configuration in which support arms like those described above are used, the load of the movable step tends to concentrate at a pivot-joint point of each support arm relative to the vehicle body and a pivot-joint point of each support arm relative to the movable step. If the number of the support arms is to be increased to three or larger to mitigate the load concentration, the lengths of these support arms need to be exactly controlled such that the turning support arms do not interfere with one another. This makes it difficult to enhance the supporting rigidity of the support arms, which is where there is still room for improvement.

The present disclosure provides a step device for a vehicle in which higher supporting rigidity can be secured.

A step device for a vehicle according to an aspect of the present disclosure includes a movable step supported under a door opening; a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door; a support arm that has a first pivot-joint point relative to a vehicle body and a second pivot-joint point relative to the movable step, and supports the movable step toward an upper side; and a pressure bearing member that is provided at a position between the first pivot-joint point and the second pivot-joint point and bears the load of the support arm by coming into sliding contact with the support arm.

In this aspect, the pressure bearing member supports the load of the support arm, so that the load of the movable step supported by the support arm is less likely to concentrate at the first pivot-joint point of the support arm relative to the vehicle body and the second pivot-joint point of the support arm relative to the movable step. Thus, higher supporting rigidity can be secured.

In the above aspect, the support arm may have a support bracket that is fixed to the vehicle body to form the first pivot-joint point, and the pressure bearing member may be provided on the support bracket.

In this aspect, the pressure bearing member provided on the support bracket supports the load of the support arm, so that the load of the movable step supported by the support arm is less likely to concentrate at the first pivot-joint point of the support arm relative to the vehicle body. Thus, higher supporting rigidity can be secured.

In the above aspect, the step device may further include a holding member that is fixed to the movable step so as to hold, together with the movable step, the support arm at the second pivot-joint point, and the pressure bearing member may be provided on the holding member.

In this configuration, the holding member holds, together with the movable step, the support arm, which increases the supporting rigidity of the support arm at the second pivot-joint point thereof relative to the movable step. Further, the pressure bearing member provided on the holding member supports the load of the support arm, so that the load of the movable step is less likely to concentrate at the second pivot-joint point. Thus, higher supporting rigidity can be secured.

In the above aspect, the pressure bearing member may have a sliding contact surface that extends in a direction intersecting the support arm. In this configuration, the pressure bearing member can be stably brought into sliding contact with the support arm that turns around the first pivot-joint point and the second pivot-joint point as fulcrums. Thus, higher supporting rigidity can be secured.

In the above configuration, the pressure bearing member may be made of a resin having a shock absorbing property and a self-lubricating property. This configuration makes it possible to ensure smooth turning of the support arm by absorbing a shock load of the movable step transmitted to the support arm and, at the same time, to reduce the sliding sound of the support arm.

In the above configuration, a ridge that extends in a direction intersecting the support arm and comes into sliding contact with the support arm may be provided on a lower surface of the movable step. Further, in the above configuration, the movable step may include a movable base to which the support arm is coupled, and a resin cover that is fixed to the movable base to be a step surface. The ridge may be provided on a lower surface of the resin cover and protrude toward a lower surface side of the movable step through a hole provided in the movable base.

In this configuration, the ridge provided on the movable step comes into sliding contact with the support arm located under the ridge, so that the load of the movable step can be stably supported. Further, as the ridge extends in a direction intersecting the support arm, the area of contact between the ridge and the support arm can be reduced. Thus, it is possible to ensure smooth turning of the support arm and, at the same time, to reduce the sliding sound of the support arm.

In the above aspect, the support arm may include two main arms that are provided at positions apart from each other in the vehicle front-rear direction, and a sub-arm that has a joint at which the sub-arm is bendable and that is provided at a position apart from each of the main arms.

In this configuration, the bent shape of the sub-arm having a joint changes such that the turning sub-arm does not interfere with each turning main arm. Thus, the number of the support arms can be increased to enhance the supporting rigidity for the movable step, while smooth movement of the movable step is ensured.

In the above configuration, the sub-arm may be provided between the main arms. In this configuration, the two main arms can be disposed a greater distance apart from each other in the vehicle front-rear direction. Thus, the movable step can be more stably supported.

In the above aspect, the step device may further include a stopper that restricts a movable range of the movable step by coming into contact with the support arm. In this configuration, the movable step supported by the support arm can be appropriately moved in the vehicle width direction between the retracted position and the deployed position. Thus, the quality of the movable step can be enhanced.

The present disclosure can secure higher supporting rigidity.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a plan view showing the sliding door that opens and closes in a vehicle front-rear direction while shifting in a vehicle width direction, and the route of movement of the sliding door;

FIG. 3B is a plan view showing the sliding door that opens and closes in the vehicle front-rear direction while shifting in the vehicle width direction, and the route of movement of the sliding door;

FIG. 4A is a plan view of the step device;
FIG. 4B is a plan view of the step device;
FIG. 5A is a plan view of the step device;
FIG. 5B is a plan view of the step device.

FIG. 16A is a plan view of the sub-step;
FIG. 16B is a sectional view of the sub-step;
FIG. 16C is a sectional view of the sub-step;
FIG. 17A is a plan view of support arms that support the movable step;
FIG. 17B is a plan view of the support arms that support the movable step;

FIG. 29A is a plan view of the cover member;
FIG. 29B is a plan view of the cover member disposed under the support arms and the support brackets;

FIG. 39A is an enlarged view of the retaining member provided on the bottom wall of the cover member;

FIG. 39B is an enlarged view of the retaining member provided on the bottom wall of the cover member;

DETAILED DESCRIPTION OF EMBODIMENTS

Figure 1:
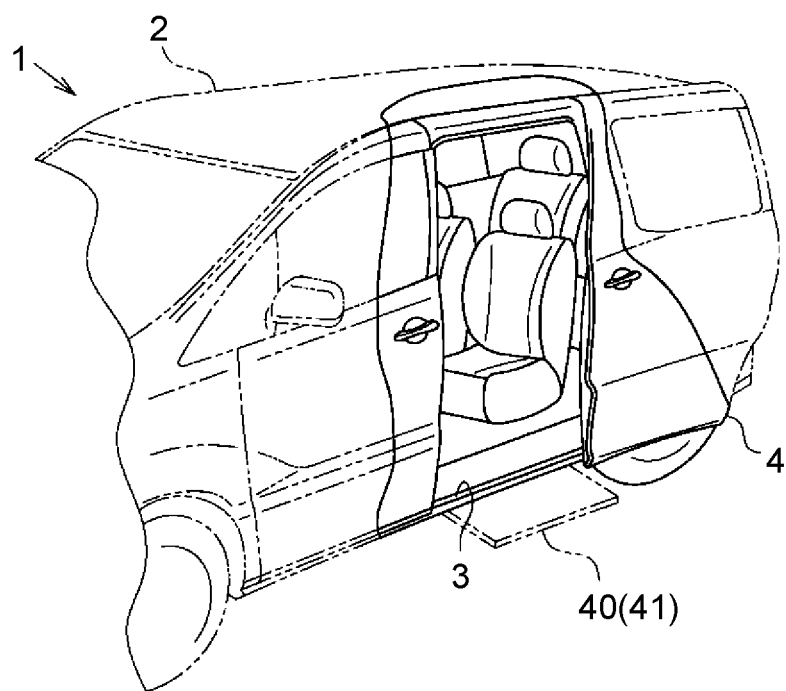
FIG. 1 is a perspective view of a vehicle showing a sliding door and a step device provided at a door opening.

One embodiment relating to a step device for a vehicle will be described below in accordance with the drawings. As shown in FIG. 1, a vehicle 1 of this embodiment includes a sliding door 4 that can move in a vehicle front-rear direction (a left-right direction in FIG. 1) so as to open and close a door opening 3 provided in a side surface of a vehicle body 2.

Figure 2:
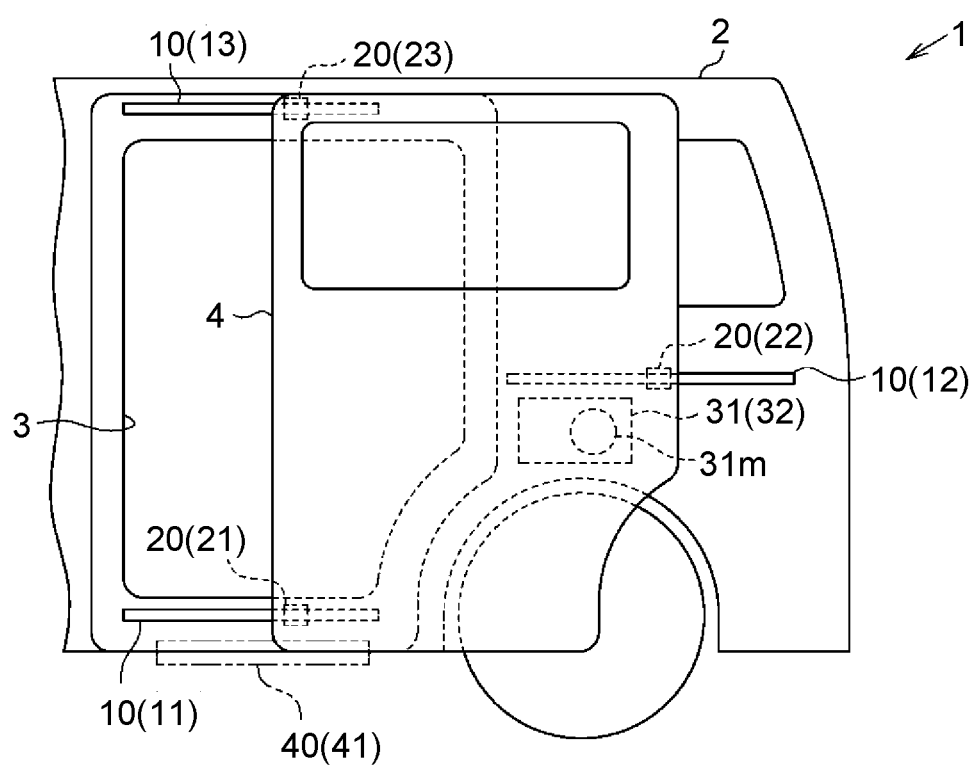
FIG. 2 is a side view of the vehicle showing the sliding door and the step device provided at the door opening.

Specifically, as shown in FIG. 2, the vehicle 1 of the embodiment has a plurality of guide rails 10 that is provided on the side surface of the vehicle body 2 and extends in the vehicle front-rear direction. In particular, the vehicle 1 of the embodiment is provided with a lower rail 11 disposed at a lower edge of the door opening 3, a center rail 12 disposed on a rear side of the door opening 3, and an upper rail 13 disposed at an upper edge of the door opening 3. Further, each of these guide rails 10 has a guide roller unit 20 coupled thereto that can slide along an extension direction of the guide rail 10. In the vehicle 1 of the embodiment, the sliding door 4 is supported by the vehicle body 2 through the guide roller units 20 such that the sliding door 4 can open and close along the guide rails 10 extending in the vehicle front-rear direction.

As shown in FIG. 3A and FIG. 3B, each of the guide rails 10 of the embodiment has, at a longitudinal end portion 10f on a vehicle front side, i.e., an end portion on a side where the sliding door 4 is fully closed, a curved portion 30 that curves toward an inner side in the vehicle width direction (the upper side in FIG. 3A and FIG. 3B) while extending from a vehicle rear side toward the vehicle front side. For the convenience of illustration, the lower rail 11 and a lower roller unit 21 are shown in FIG. 3A and the center rail 12 and a center roller unit 22 are shown in FIG. 3B, while the upper rail 13 and an upper roller unit 23 are not shown. The sliding door 4 of the embodiment opens and closes in the vehicle front-rear direction while shifting in the vehicle width direction in a state of being guided by the curved portions 30 provided in the guide rails 10.

When the sliding door 4 of the embodiment is in a fully closed position Pc, an outer surface 4a thereof is substantially flush with a side surface 2a of the vehicle body 2. When opening from the fully closed position Pc, the sliding door 4 moves toward the vehicle rear side while shifting toward the outer side in the vehicle width direction. A route of movement R of the sliding door 4 has, on the side of the fully closed position Pc, a width-direction shifting zone Re in which the sliding door 4 shifts in the vehicle width direction. In FIG. 3A and FIG. 3B, the long dashed short dashed line represents the track of the opening and closing sliding door 4, particularly a front end portion thereof. Thus, in the vehicle 1 of the embodiment, the sliding door 4 does not interfere with the vehicle body 2 when opening and closing.

As shown in FIG. 2, the vehicle 1 of the embodiment is provided with a power sliding door device 31 that opens and closes the sliding door 4 using a motor 31m as a driving source. An occupant of the vehicle 1 can open and close the sliding door 4 not only by manual operation but also by operating a door handle (not shown), an operation switch provided inside a vehicle cabin, or a portable device. The power sliding door device 31 monitors changes in driving power required to open and close the sliding door 4, i.e., a force required to open and close the sliding door 4, based on rotation of the motor 31m, an amount of current applied thereto, etc. Thus, the power sliding door device 31 functions as a catching detection device 32 that detects whether any object is caught in the sliding door 4.

In particular, the catching detection device 32 of the embodiment determines that an object is caught in the sliding door 4 when, for example, the amount of current to the motor 31m increases beyond a predetermined threshold value while the sliding door 4 is driven to open or close. To release an object caught in the sliding door 4 or prevent the sliding door 4 from catching an object, the power sliding door device 31 of the embodiment executes driving control involving, for example, driving the sliding door 4, which is being driven to close, reversely in an opening direction or stopping the sliding door 4 being driven to open.

As shown in FIG. 1 and FIG. 2, the vehicle 1 of the embodiment is provided with a step device 41 that deploys a step member 40 serving as a step under the door opening 3 to be used by an occupant who gets in or out of the vehicle 1.

Specifically, as shown in FIG. 4A, FIG. 4B, FIG. 5A, FIG. 5B, and FIG. 6, the step device 41 of the embodiment includes a movable step 42 that is supported under the door opening 3 in a state of being movable in the vehicle width direction, and a sub-step 43 that is disposed under the door opening 3, along with the movable step 42, in a state of being fixed to the vehicle body 2. The vehicle width direction corresponds to an up-down direction in FIG. 4A, FIG. 4B, FIG. 5A, and FIG. 5B and a left-right direction in FIG. 6.

In particular, as shown in FIG. 4A to FIG. 7, the step device 41 of the embodiment includes a plurality of support arms 44 that is turnably coupled to both the vehicle body 2 and the movable step 42. By being supported by the support arms 44, the movable step 42 of the embodiment moves under the sub-step 43 in the vehicle width direction while maintaining a substantially horizontal posture.

More specifically, the step device 41 of the embodiment includes a plurality of support brackets 45 that is fixed to a lower surface 2b of the vehicle body 2. The support arms 44 of the embodiment are coupled to the vehicle body 2 through the support brackets 45. In the step device 41 of the embodiment, each support arm 44 turns in a substantially horizontal direction around, as a fulcrum, a first pivot-joint point M1 relative to the vehicle body 2 that is formed by this coupling.

Figure 6:
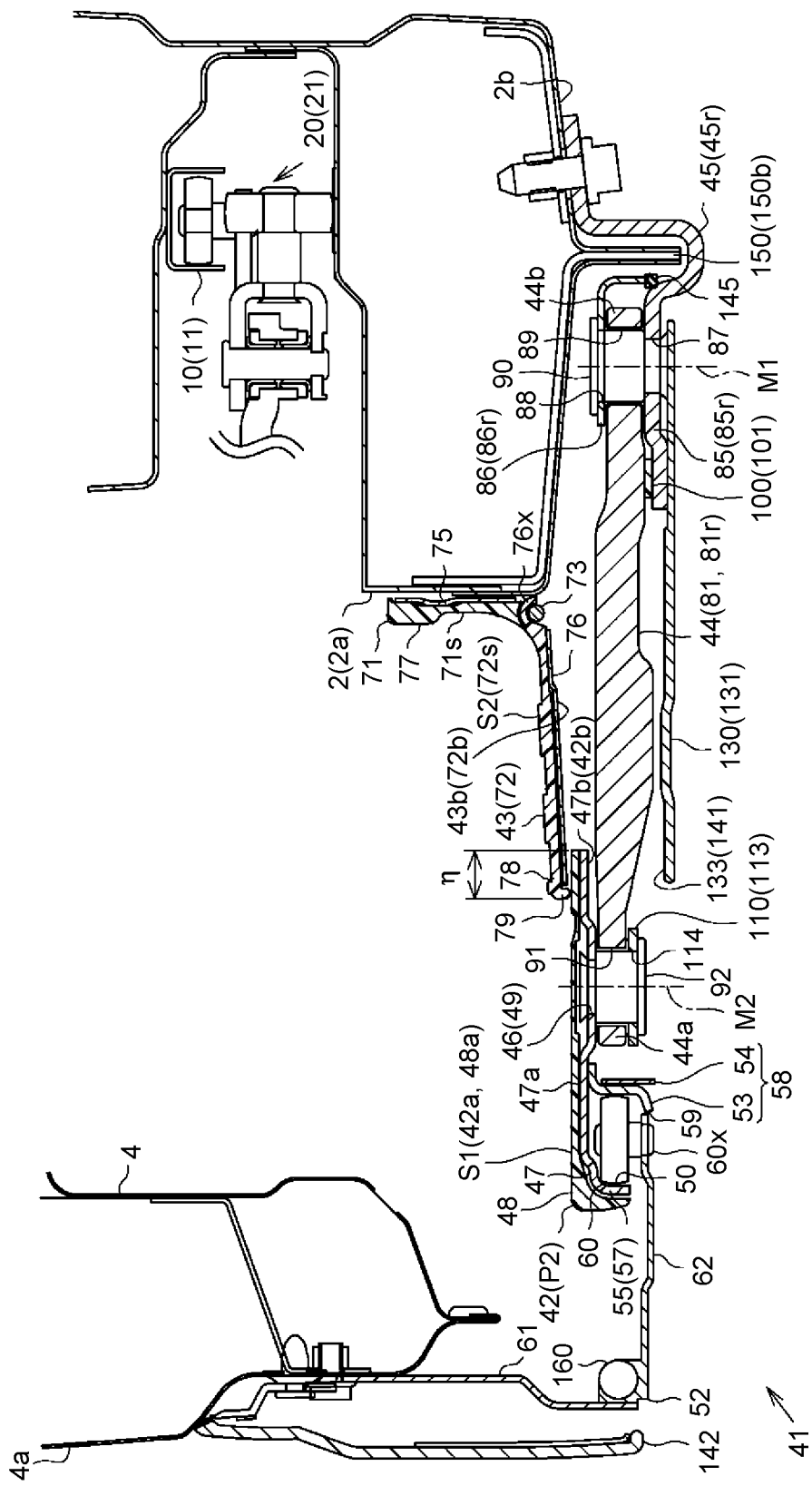
FIG. 6 is a sectional view of the step device.
Figure 7:
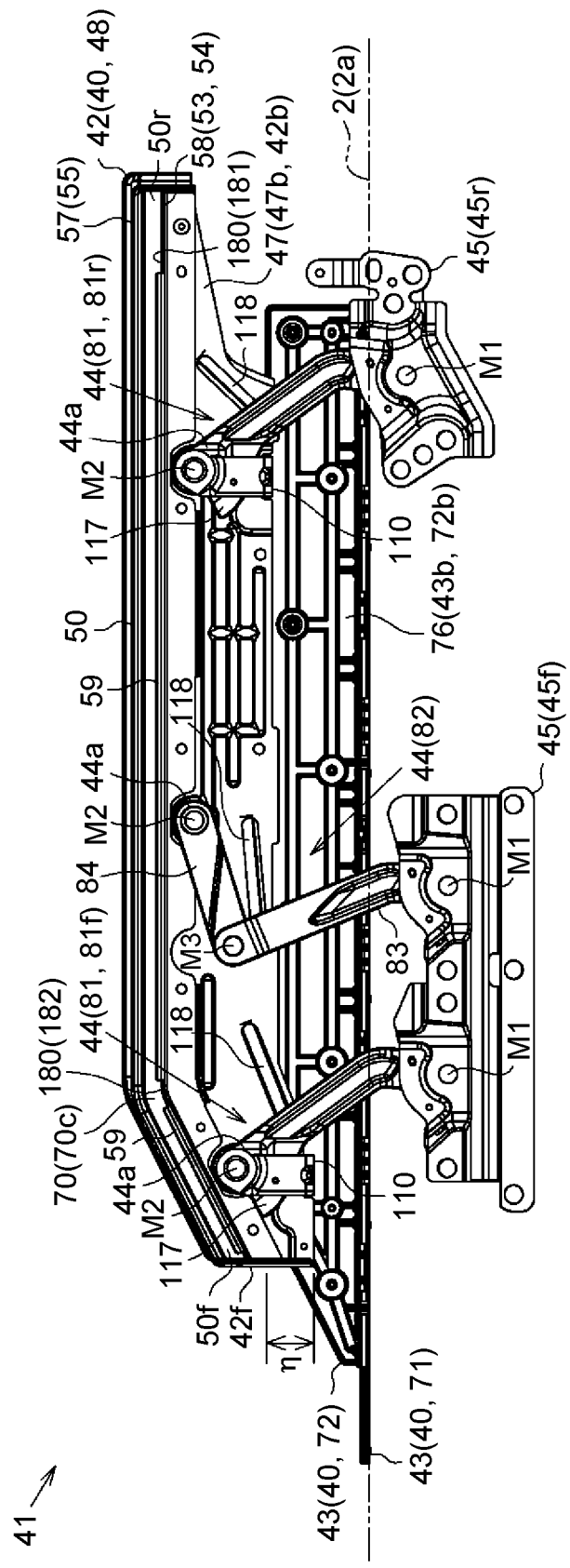
FIG. 7 is a bottom view of the step device.
Figure 8:
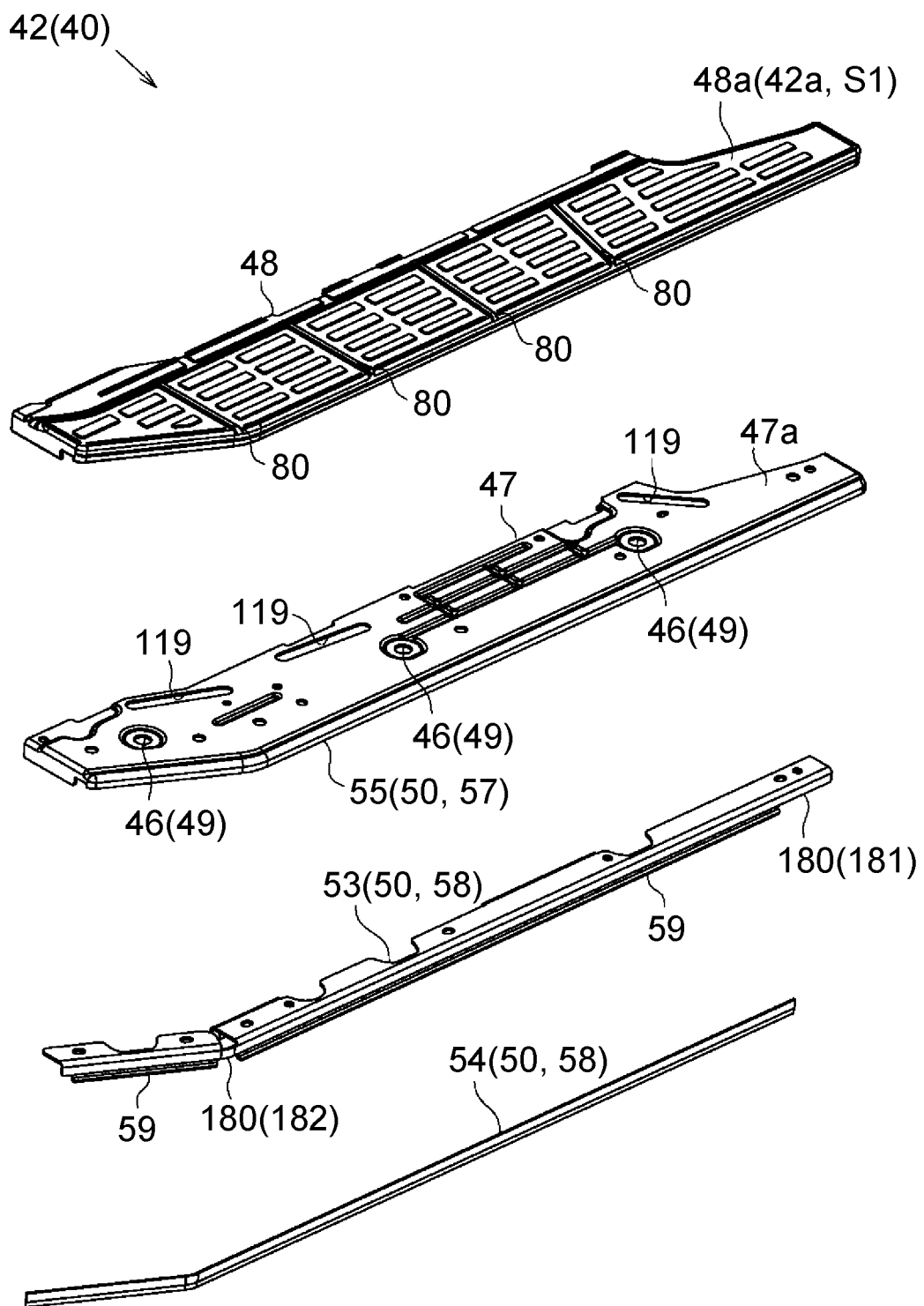
FIG. 8 is an exploded perspective view of a movable step.

As shown in FIG. 6 to FIG. 8, the movable step 42 of the embodiment includes a substantially flat-plate-shaped movable base 47 that has coupling portions 46 for the respective support arms 44, and a resin cover 48 that is fixed to the movable base 47 in a state of covering an upper surface 47a of the movable base 47. In the movable step 42 of the embodiment, an upper surface 48a of the resin cover 48 constitutes a step surface S1 on which a user places his or her foot. The coupling portions 46 for the respective support arms 44 are formed as insertion holes 49 extending through the movable base 47 in the up-down direction. Thus, in the step device 41 of the embodiment, each support arm 44 turns relatively to the movable step 42 around, as a fulcrum, a second pivot-joint point M2 that is formed using the coupling portion 46, while maintaining a substantially horizontal posture of the movable step 42.

In the movable step 42 of the embodiment, the movable base 47 is formed using metal. The upper surface 48a of the resin cover 48 has depressions and protrusions to prevent slipping. Thus, the step device 41 of the embodiment allows an occupant having placed his or her foot on the movable step 42 to safely step onto the step surface S1.

As shown in FIG. 4A to FIG. 9, the movable step 42 of the embodiment includes a guide rail 50 that is provided on a lower surface 42b thereof and extends in a longitudinal direction. The step device 41 of the embodiment includes a guide roller unit 52 as a coupling member that, in a state of being supported by the sliding door 4, engages with the guide rail 50 of the movable step 42.

As shown in FIG. 6 to FIG. 8, the guide rail 50 of the embodiment is formed by fixing, to the movable base 47 constituting the lower surface 42b of the movable step 42, rail members 53, 54 that extend in the longitudinal direction of the movable base 47. In particular, the movable base 47 of the embodiment includes a peripheral wall 55 that is formed by folding down a peripheral edge portion of the movable base 47 on the outer side in the vehicle width direction toward the side of the lower surface 47b and extends in the longitudinal direction. The rail members 53, 54 are integrally fixed to the lower surface 47b of the movable base 47 so as to be parallel to the peripheral wall 55.

Figure 9:
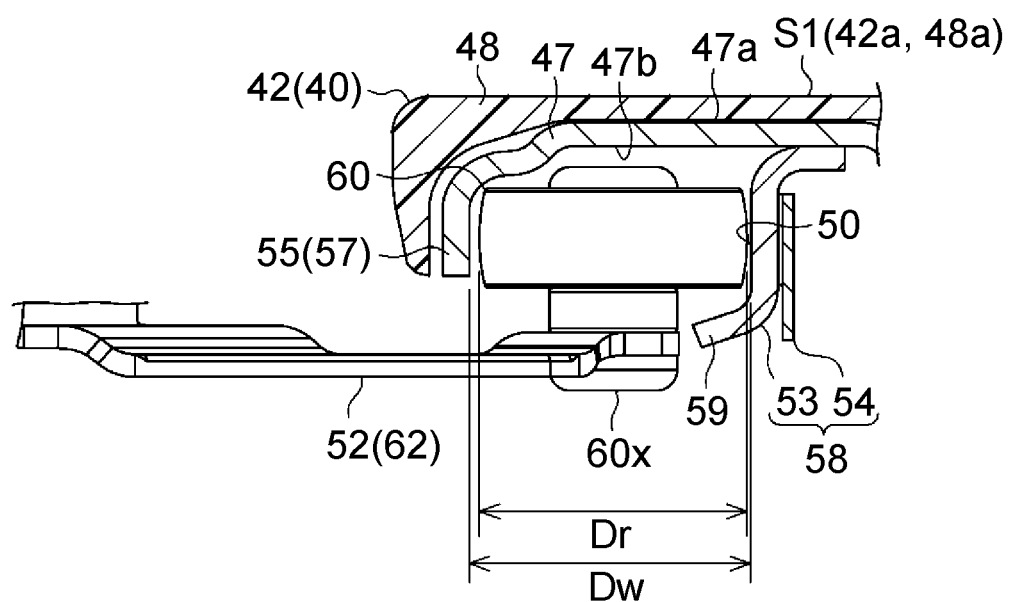
FIG. 9 is a sectional view showing a guide roller unit as a coupling member that engages with a guide rail provided on the movable step.

As shown in FIG. 6 and FIG. 9, in the guide rail 50 of the embodiment, the peripheral wall 55 of the movable base 47 constitutes a side wall 57 on the outer side in the vehicle width direction, and the rail members 53, 54 facing the peripheral wall 55 in the vehicle width direction constitute a side wall 58 on the inner side in the vehicle width direction. The side wall 58 on the inner side in the vehicle width direction is provided with a fall prevention flange 59 that is formed by bending a lower end portion of the side wall 58 so as to extend toward the side wall 57 on the outer side in the vehicle width direction. In the step device 41 of the embodiment, the fall prevention flange 59 is provided in the rail member 53 constituting a part of the side wall 58 (see FIG. 8). The guide roller unit 52 of the embodiment includes a guide roller 60 that is disposed between side walls 57, 58 of the guide rail 50 facing each other.

Figure 10:
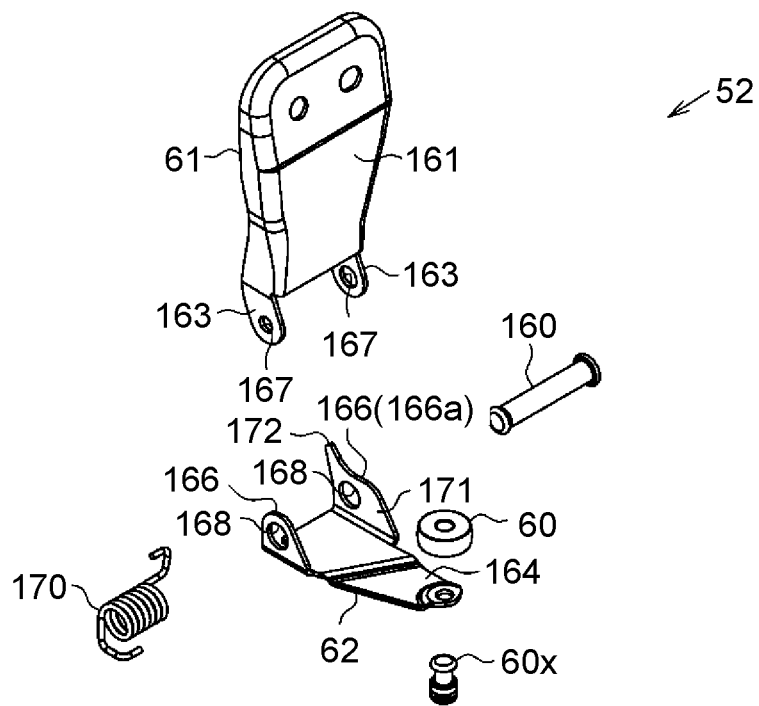
FIG. 10 is an exploded perspective view of the guide roller unit.

In particular, as shown in FIG. 6, FIG. 9, and FIG. 10, the guide roller unit 52 of the embodiment includes a fixed member 61 that is fixed to the sliding door 4 in a state of extending in the up-down direction, and an arm member 62 that extends toward the inner side in the vehicle width direction in a state of being coupled to a lower end of the fixed member 61. A support shaft 60x extending in the up-down direction is provided at a leading end of the arm member 62. The support shaft 60x of the guide roller unit 52 of the embodiment rotatably supports the guide roller 60.

The guide roller unit 52 of the embodiment moves integrally with the sliding door 4 based on opening and closing of the sliding door 4. The guide roller 60 disposed inside the guide rail 50 also moves in the vehicle front-rear direction according to the direction of movement of the sliding door 4. In the guide rail 50 of the embodiment, the fall prevention flange 59 provided at the lower end of the side wall 58 prevents the guide roller 60 located between the side walls 57, 58 from coming off. The guide roller unit 52 of the embodiment causes the movable step 42 provided with the guide rail 50 to move in the vehicle width direction as the guide roller 60 comes into sliding contact with and presses the side wall 57 of the guide rail 50 located on the outer side in the vehicle width direction or the side wall 58 of the guide rail 50 located on the inner side in the vehicle width direction.

In particular, the guide roller unit 52 of the embodiment causes the movable step 42 to move toward the outer side in the vehicle width direction as the guide roller 60 comes into sliding contact with the side wall 57 of the guide rail 50 located on the outer side in the vehicle width direction and, while pressing the side wall 57, moves inside the guide rail 50 in a direction toward the vehicle rear side that is the opening direction of the sliding door 4. The guide roller unit 52 causes the movable step 42 to move toward the inner side in the vehicle width direction as the guide roller 60 comes into sliding contact with the side wall 58 of the guide rail 50 located on the inner side in the vehicle width direction and, while pressing the side wall 58, moves inside the guide rail 50 in a direction toward the vehicle front side that is the closing direction of the sliding door 4. Thus, in the step device 41 of the embodiment, the movable step 42 is moved from a retracted position P1 to a deployed position P2 in conjunction with opening of the sliding door 4, and is moved from the deployed position P2 to the retracted position P1 in conjunction with closing of the sliding door 4 (see FIG. 4A, FIG. 4B, FIG. 5A, and FIG. 5B).

Figure 11:
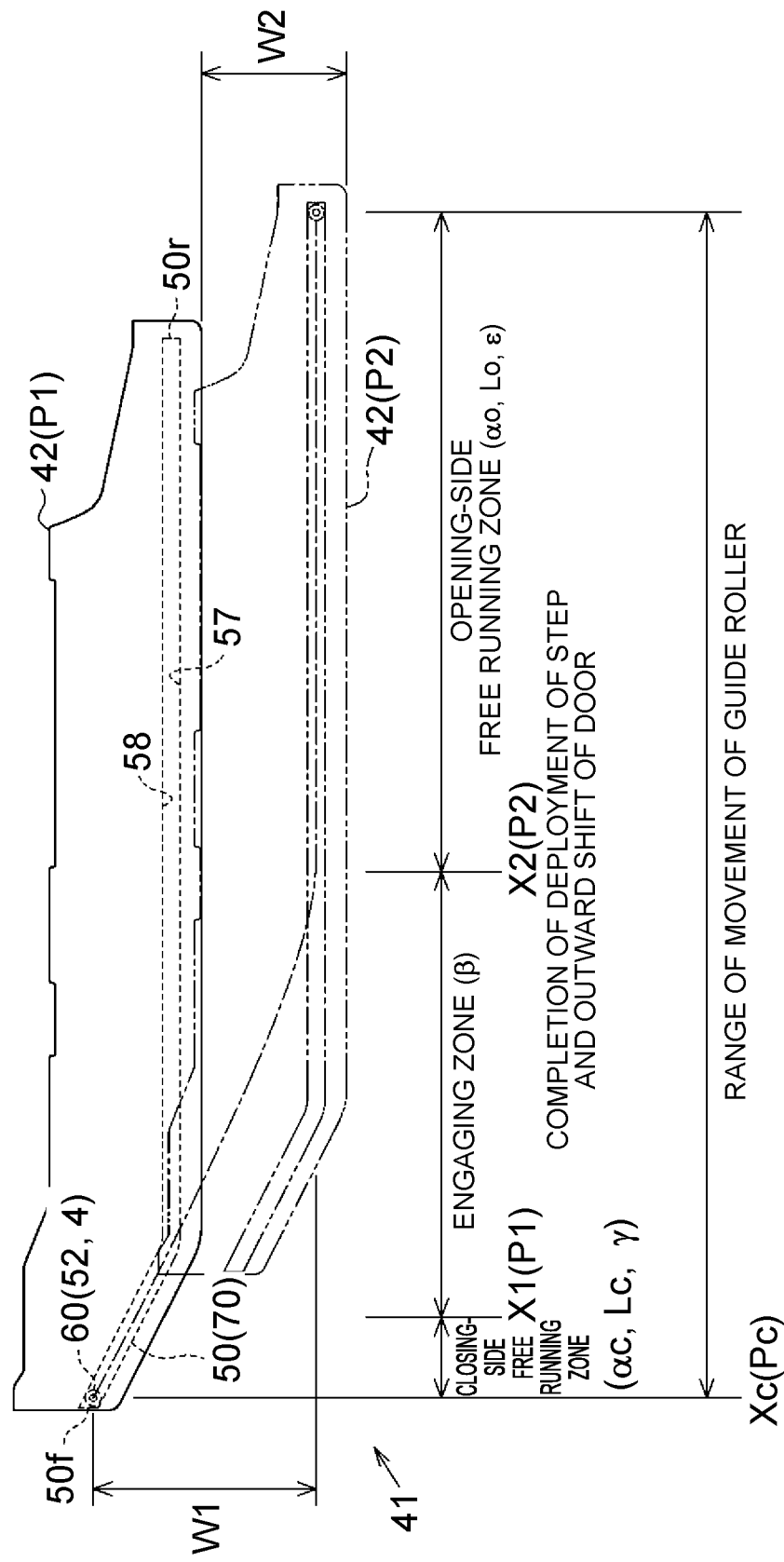
FIG. 11 is a view illustrating free running zones set for the guide rail.

More specifically, as shown in FIG. 7 and FIG. 11, the guide rail 50 of the embodiment includes, at a longitudinal end portion 50f on the vehicle front side, i.e., an end portion on the side where the sliding door 4 is fully closed, a curved portion 70 that curves toward the inner side in the vehicle width direction while extending from the vehicle rear side toward the vehicle front side, like the curved portion 30 provided in each guide rail 10 of the sliding door 4. The inner side in the vehicle width direction corresponds to the lower side in FIG. 7 and the upper side in FIG. 11. Thus, in the step device 41 of the embodiment, the movable step 42 can be gently moved in the vehicle width direction as the guide roller 60 moves smoothly inside the guide rail 50 based on opening or closing of the sliding door 4.

Free Running Zones

Next, free running zones set for the guide rail 50 of the embodiment will be described. As shown in FIG. 11, the guide rail 50 of the embodiment has two free running zones, one near the longitudinal end portion 50f on the vehicle front side and the other on the vehicle rear side of the curved portion 70. In these free running zones, the guide roller 60 serving as an engaging part of the coupling member that moves integrally with the sliding door 4 does not press the side walls 57, 58 located on both sides of the guide roller 60 in the vehicle width direction. In particular, in the guide rail 50 of the embodiment, a terminal end region Lc on a closing side including a terminal end position Xc at which the guide roller 60 is located when the sliding door 4 is fully closed constitutes a closing-side free running zone αc. In the guide rail 50 of the embodiment, a moving region Lo on an opening side from a moving position X2 at which the guide roller 60 is located when the movable step 42 reaches the deployed position P2 constitutes an opening-side free running zone αo.

In the step device 41 of the embodiment, when the guide roller 60 moves in an engaging zone β located between the closing-side free running zone αc and the opening-side free running zone αo, the movable step 42 moves in the vehicle width direction in conjunction with opening and closing of the sliding door 4. Thus, the movable step 42 of the embodiment reaches the deployed position P2 from the retracted position P1 by an amount of shift W2 in the vehicle width direction that is smaller than an amount of shift W1 in the vehicle width direction that the sliding door 4 undergoes while opening or closing (W1>W2).

Specifically, as shown in FIG. 9, in the guide rail 50 of the embodiment, the interval between the side walls 57, 58 facing each other in the vehicle width direction, i.e., a rail width Dw, is set to a value larger than a diameter Dr of the guide roller 60 (Dw>Dr). The closing-side free running zone αc of the embodiment constitutes a non-sliding-contact zone γ in which the guide roller 60 moving in the closing-side free running zone αc in the vehicle front-rear direction moves inside the guide rail 50 in the vehicle width direction, while shifting in a rail width direction without coming into sliding contact with the side walls 57, 58.

Figure 12:
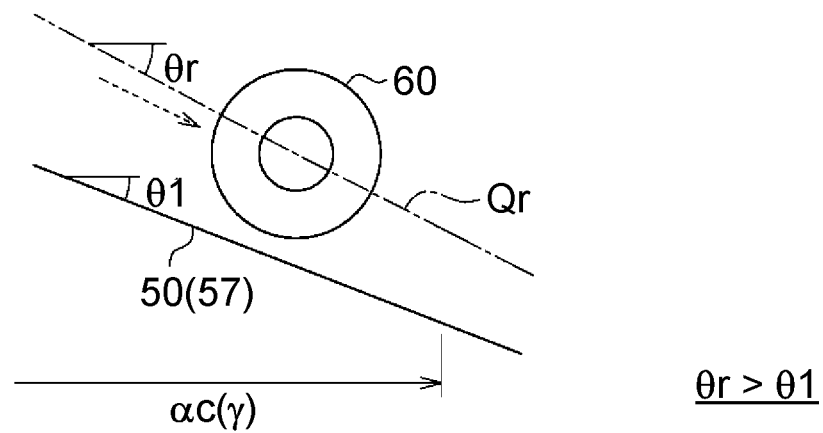
FIG. 12 is a view illustrating an action in a closing-side free running zone during opening of the sliding door.
Figure 13:
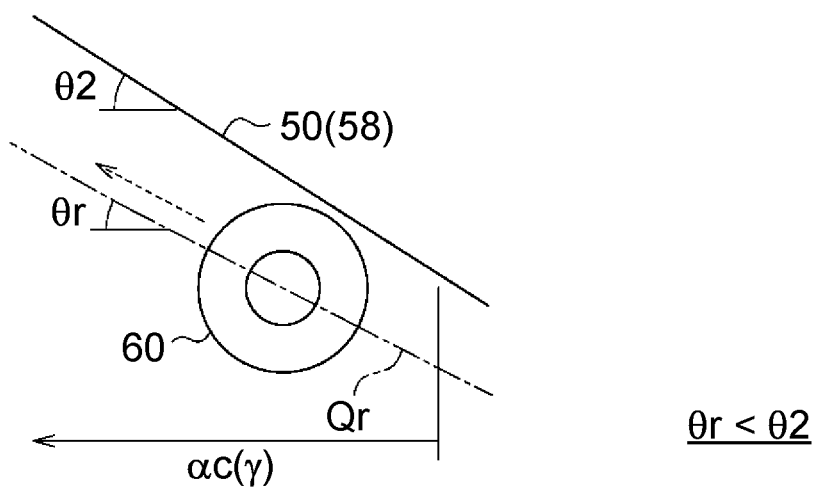
FIG. 13 is a view illustrating an action in a closing-side free running zone during closing of the sliding door.

More specifically, as shown in FIG. 12 and FIG. 13, in the closing-side free running zone αc, a gradient of change θ1 of the side wall 57 located on the outer side of the guide roller 60 in the vehicle width direction is set to be smaller than a gradient of change θr set for a track of movement Qr of the guide roller 60 that moves inside the guide rail 50 in the vehicle front-rear direction while moving in the vehicle width direction (θr>θ1). The lower side and the left side in FIG. 12 and FIG. 13 correspond to the outer side in the vehicle width direction and the vehicle front side, respectively. A gradient of change θ2 of the side wall 58 located on the inner side of the guide roller 60 in the vehicle width direction is set to be larger than the gradient of change θr set for the track of movement Qr of the guide roller 60 (θr<θ2).

Thus, as shown in FIG. 12, in the guide rail 50 of the embodiment, the closing-side free running zone αc as the non-sliding-contact zone γ constitutes a zone in which, when the sliding door 4 opens, the guide roller 60 moving inside the guide rail 50 toward the vehicle rear side shifts in the rail width direction so as to be gradually closer to the side wall 57 located on the outer side of the guide roller 60 in the vehicle width direction. Thus, in the guide rail 50 of the embodiment, the guide roller 60 having passed through the closing-side free running zone αc comes quickly into sliding contact with the side wall 57 located on the outer side of the guide roller 60 in the vehicle width direction and presses the side wall 57.

Further, as shown in FIG. 13, the closing-side free running zone αc as the non-sliding-contact zone γ constitutes a zone in which, when the sliding door 4 closes, the guide roller 60 moving inside the guide rail 50 toward the vehicle front side shifts in the rail width direction so as to be gradually away from the side wall 58 located on the inner side in the vehicle width direction. Thus, in the guide rail 50 of the embodiment, the guide roller 60 having entered the closing-side free running zone αc from the engaging zone β is quickly separated from the side wall 58 located on the inner side of the guide roller 60 in the vehicle width direction.

As shown in FIG. 11, in the step device 41 of the embodiment, a moving position X1 of the guide roller 60 at the border between the closing-side free running zone αc and the engaging zone β corresponds to the retracted position P1 of the movable step 42. In the step device 41 of the embodiment, when the sliding door 4 opens, the movable step 42 reaches the deployed position P2 at the same time as shift of the sliding door 4 toward the outer side in the vehicle width direction is completed. In the step device 41 of the embodiment, as described above, the moving region Lo on the opening side from the moving position X2 at which the guide roller 60 is located when the movable step 42 reaches the deployed position P2 is set as the opening-side free running zone αo, so that the movable step 42 deployed under the door opening 3 does not put a load on the sliding door 4.

Figure 14:
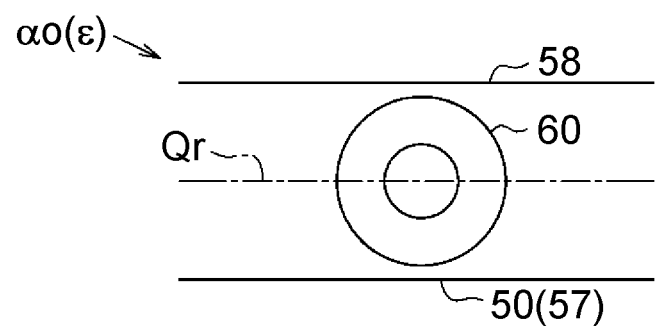
FIG. 14 is a view illustrating an action in an opening-side free running zone.
Figure 15:
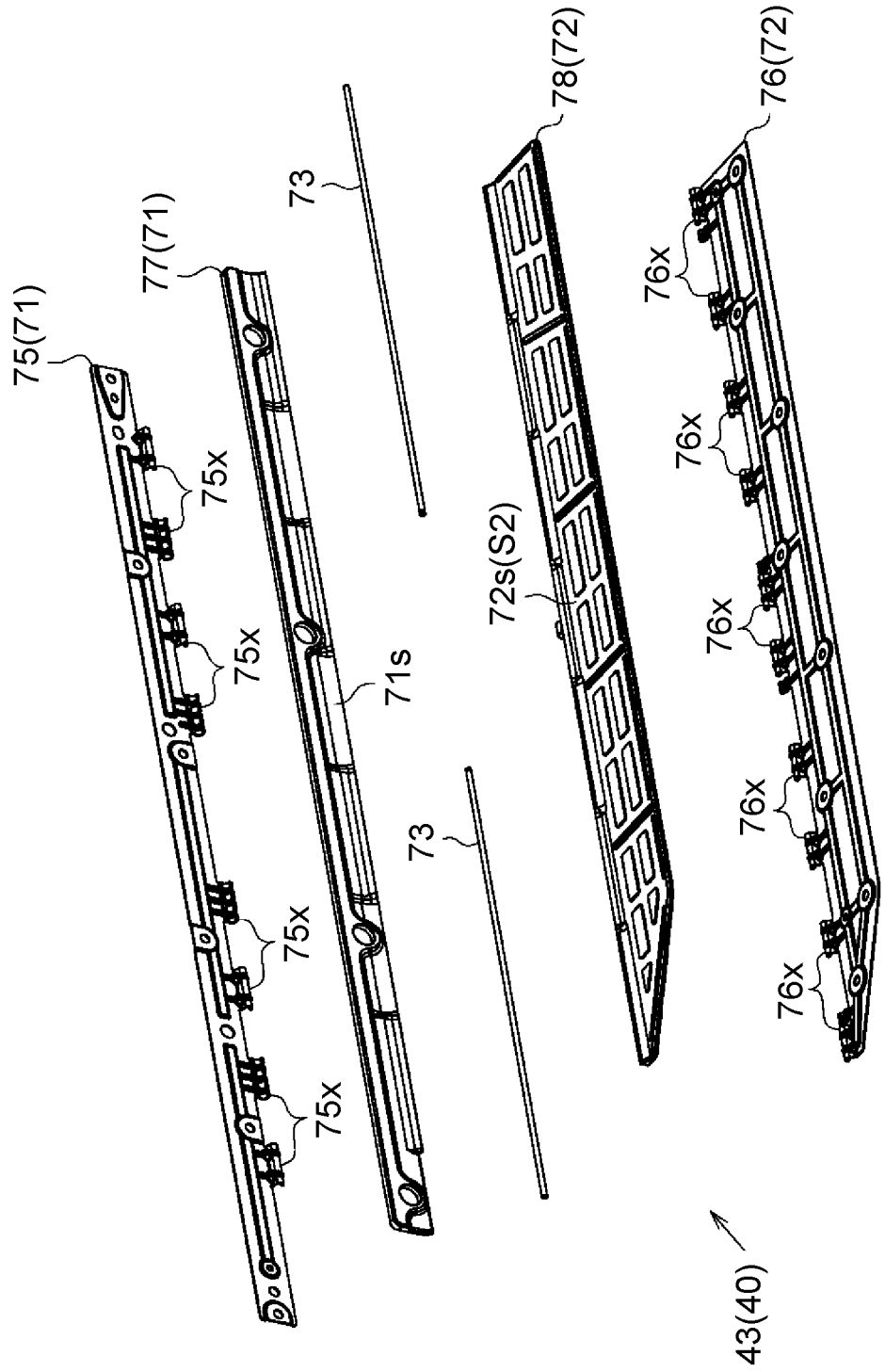
FIG. 15 is an exploded perspective view of a sub-step.

In particular, as shown in FIG. 11 and FIG. 14, in the vehicle 1 of the embodiment, when shift of the sliding door 4 in the vehicle width direction is completed, the guide roller 60 that moves integrally with the sliding door 4 moves in the vehicle front-rear direction, substantially in a straight line. Based on this movement, a vehicle rear-side part of the guide rail 50 of the embodiment corresponding to the moving region Lo on the opening side extends in the vehicle front-rear direction, substantially in a straight line. Thus, in the step device 41 of the embodiment, a parallel zone ε in which the side walls 57, 58 of the guide rail 50 extend parallel to the track of movement Qr of the guide roller 60 is formed, and the moving region Lo on the opening side constitutes the opening-side free running zone αo.

Sub-Step

Next, the configuration of the sub-step 43 in the step device 41 of the embodiment will be described.

As shown in FIG. 6, FIG. 15, and FIG. 16A to FIG. 16C, in the step device 41 of the embodiment, the sub-step 43 disposed under the door opening 3 along with the movable step 42 includes a base part 71 that is located above the movable step 42 and fixed to the side surface 2a of the vehicle body 2 and a step part 72 that is coupled to the base part 71 so as to be turnable in the up-down direction.

In the step device 41 of the embodiment, the base part 71 and the step part 72 are coupled together through coupling shafts 73 that extend in a longitudinal direction of these parts. The base part 71 and the step part 72 are formed respectively by laying, on base members 75, 76 that have fitting portions 75x, 76x for the coupling shafts 73, resin covers 77, 78 that constitute decorative surfaces 71s, 72s of these base members 75, 76. In the sub-step 43 of the embodiment, the base part 71 is fixed to the side surface 2a of the vehicle body 2 in such a position that the step part 72 that shifts in the up-down direction by turning around the coupling shafts 73 comes into sliding contact with an upper surface 42a, i.e., the step surface S1, of the movable step 42 disposed under the sub-step 43.

In particular, the sub-step 43 of the embodiment has a structure in which a part of the resin cover 78 protrudes toward the side of a lower surface 72b at a leading end portion of the step part 72. In the step device 41 of the embodiment, a projection 79 thus formed comes into sliding contact with the upper surface 42a of the movable step 42.

Specifically, as shown in FIG. 4A to FIG. 6, the movable step 42 of the embodiment moves under the sub-step 43 toward the outer side in the vehicle width direction and is thereby disposed in the deployed position P2 in which the movable step 42 protrudes from the sub-step 43 toward the outer side in the vehicle width direction. Also when the movable step 42 is in the deployed position P2, the sub-step 43 of the embodiment maintains the state where the step part 72 is in sliding contact with the upper surface 42a. The sub-step 43 has an overlapping region η that covers an upper side of the movable step 42 in the state where the movable step 42 is disposed in the deployed position P2. Thus, in the sub-step 43 of the embodiment, the decorative surface 72s of the step part 72 forms a step surface S2 that is integral with the step surface S1 of the movable step 42.

In the step device 41 of the embodiment, the resin cover 78 constituting the step surface S2 of the step part 72 of the sub-step 43 has depressions and protrusions to prevent slipping, like the step surface S1 of the movable step 42. Thus, the step device 41 of the embodiment allows an occupant who has placed his or her foot on the sub-step 43 to safely step onto the step surface S2.

Further, the sub-step 43 of the embodiment transfers a load applied to the step surface S2 to the movable step 42 as the step part 72 turns. In other words, in the step device 41 of the embodiment, a load applied to the sub-step 43 is passed on to the movable step 42. Thus, the load bearing capacity required of the sub-step 43 is reduced, which allows for reductions in the weight and manufacturing cost of the step device 41 of the embodiment.

In the step device 41 of the embodiment, a plurality of ridges 80 extending in the vehicle width direction is provided on the upper surface 42*a* of the movable step 42 with which the sub-step 43 comes into sliding contact. Further, in the sub-step 43 of the embodiment, the projection 79 provided at the leading end portion of the step part 72 comes into sliding contact with the ridges 80. Thus, in the step device 41 of the embodiment, the area of contact between the step part 72 of the sub-step 43 and the movable step 42 is reduced to thereby reduce the sliding resistance to the movable step 42 moving in the vehicle width direction.

Support Structure of Movable Step

Next, the structure of supporting the movable step 42 in the step device 41 of the embodiment will be described.

As shown in FIG. 17A, FIG. 17B, FIG. 18, and FIG. 19, the step device 41 of the embodiment includes, as the support arms 44 of the movable step 42, two main arms 81 that are disposed apart from each other in the vehicle front-rear direction and a sub-arm 82 that is disposed between the main arms 81. In the step device 41 of the embodiment, the sub-arm 82 is formed by turnably coupling together a base end-side arm 83 coupled to the vehicle body 2 and a leading end-side arm 84 coupled to the movable step 42. The sub-arm 82 of the embodiment has a joint M3 at which the sub-arm 82 is bendable. The main arms 81 are not provided with the joint M3. The step device 41 of the embodiment includes, as the support brackets 45, a front bracket 45*f* that couples a front main arm 81*f* and the sub-arm 82 to the vehicle body 2 and a rear bracket 45*r* that couples a rear main arm 81*r* to the vehicle body 2.

Specifically, as shown in FIG. 6 and FIG. 19 to FIG. 21, each support bracket 45 of the embodiment includes a bracket main body 85 that is fixed to the lower surface 2*b* of the vehicle body 2, and a holding member 86 that, together with the bracket main body 85, holds a base end part 44*b* of the support arm 44. In particular, the holding member 86 of the embodiment is disposed above the bracket main body 85, in such a position that the base end part 44*b* of the support arm 44 is held between the holding member 86 and the bracket main body 85. In the step device 41 of the embodiment, a shaft member 90 is inserted into insertion holes 87, 88 formed respectively in the bracket main body 85 and the holding member 86 and an insertion hole 89 formed in the base end part 44*b* of the support arm 44. In the step device 41 of the embodiment, the shaft member 90 is clinched, and thus the support bracket 45 forms the first pivot-joint point M1 of the support arm 44 relative to the vehicle body 2.

Figure 19:
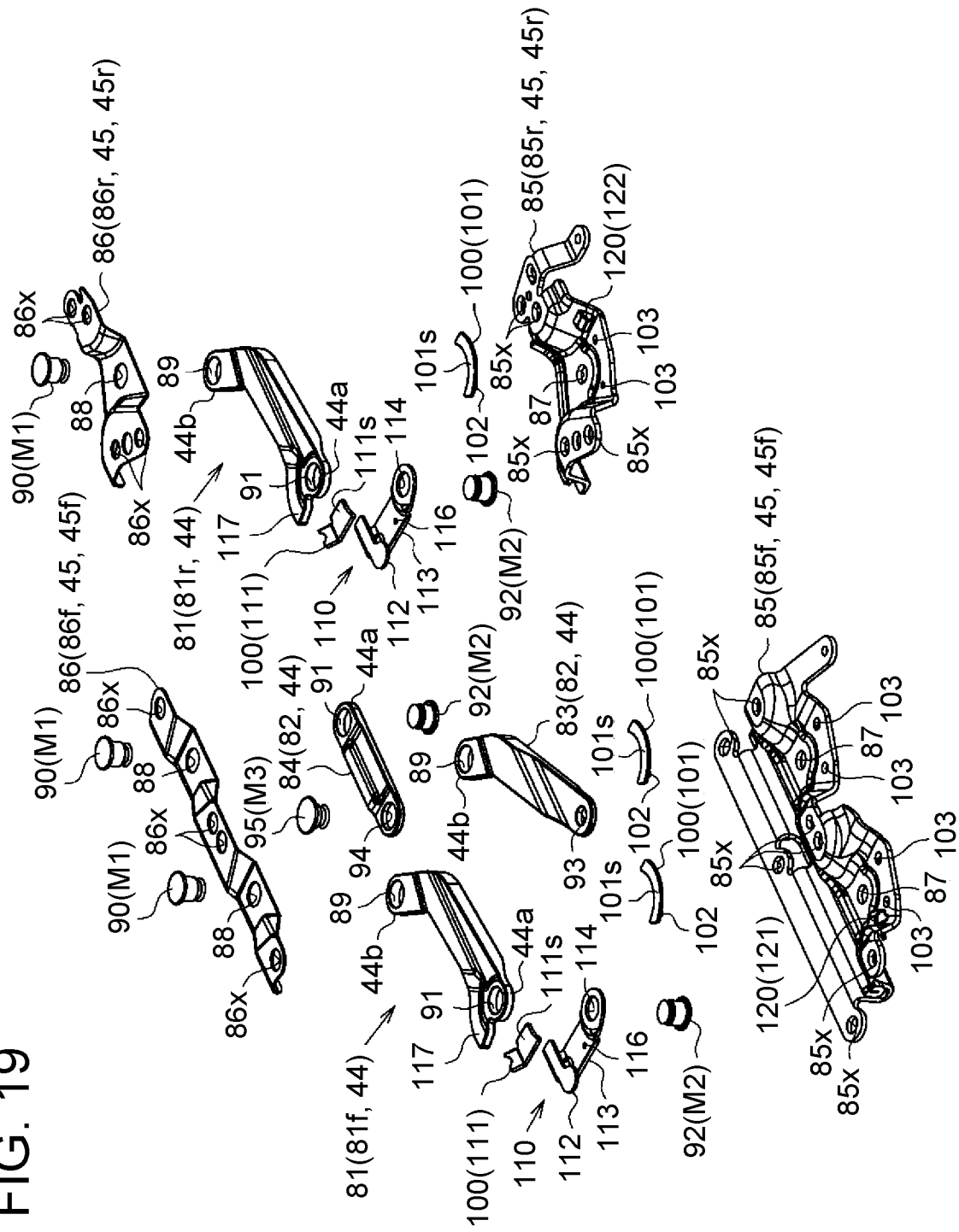
FIG. 19 is an exploded perspective view of the support arms and the support brackets.

As shown in FIG. 19, in the step device 41 of the embodiment, pluralities of fastening holes 85*x*, 86*x* are formed in the bracket main body 85 and the holding member 86, respectively. The fastening holes 85*x*, 86*x* are used to fasten the bracket main body 85 and the holding member 86 of each support bracket 45 of the embodiment integrally and simultaneously to the lower surface 2*b* of the vehicle body 2.

Figure 20:
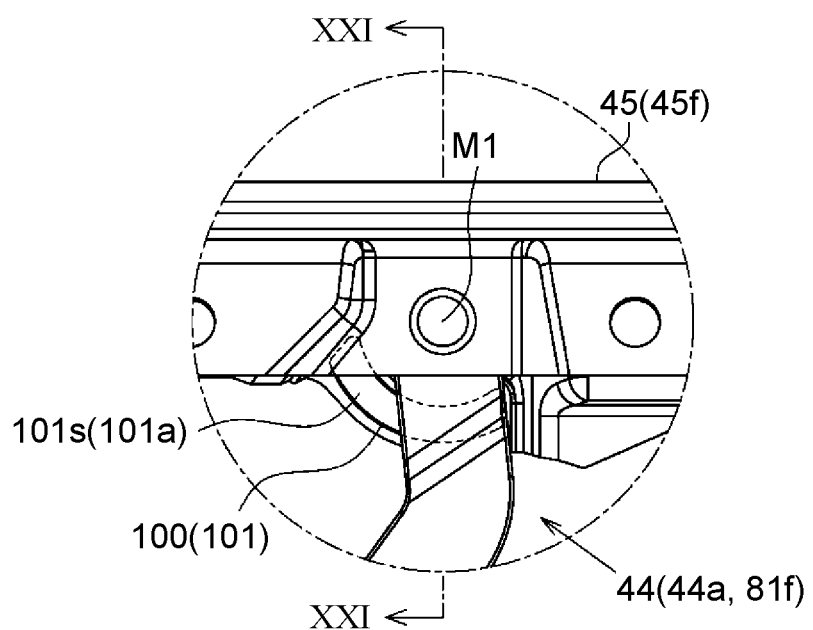
FIG. 20 is a plan view around a first joint point of the support arm relative to the support bracket.
Figure 21:
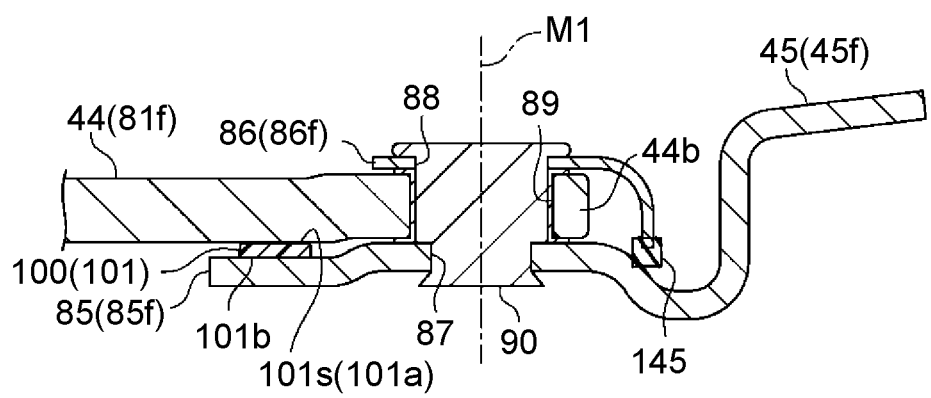
FIG. 21 is a sectional view around the first joint point of the support arm relative to the support bracket.

FIG. 20 and FIG. 21 show the structure of supporting the front main arm 81*f* by a bracket main body 85*f* and a holding member 86*f* of a front bracket 45*f*. The structure of supporting the sub-arm 82 by the front bracket 45*f*, particularly the structure of holding the base end-side arm 83 between the bracket main body 85*f* and the holding member 86*f*, is the same. Further, the structure of supporting the rear main arm 81*r* by a bracket main body 85*r* and a holding member 86*r* of a rear bracket 45*r* is also the same as the support structure of the front bracket 45*f*. For the convenience of illustration, therefore, an enlarged view and a sectional view of the support structures for the sub-arm 82 and the rear main arm 81*r* are omitted.

As shown in FIG. 6 and FIG. 17A to FIG. 19, in the step device 41 of the embodiment, the leading end part 44*a* of each support arm 44 is disposed on the lower surface 47*b* of the movable base 47 constituting a part of the movable step 42. The leading end part 44*a* of each support arm 44 is provided with an insertion hole 91 similar to the insertion hole 89 formed in the base end part 44*b*. In the step device 41 of the embodiment, a shaft member 92 is inserted into the insertion hole 91 and the insertion hole 49 of the movable base 47 constituting the coupling portion 46 on the side of the movable step 42. In the step device 41 of the embodiment, the shaft member 92 is clinched, and thus a second pivot-joint point M2 of the support arm 44 relative to the movable step 42 is formed.

As shown in FIG. 19, in the step device 41 of the embodiment, the base end-side arm 83 constituting a part of the sub-arm 82 has an insertion hole 93, similar to the insertion hole 89 constituting the first pivot-joint point M1 relative to the vehicle body 2, formed at an end portion on the opposite side from the side where the insertion hole 89 is formed. Further, the leading end-side arm 84 has an insertion hole 94, similar to the insertion hole 91 constituting the second pivot-joint point M2 relative to the movable step 42, formed at an end portion on the opposite side from the side where the insertion hole 91 is formed. In the step device 41 of the embodiment, a shaft member 95 is inserted into the insertion holes 93, 94. In the step device 41 of the embodiment, the shaft member 95 is clinched to form the joint M3 of the bendable sub-arm 82.

As shown in FIG. 17A and FIG. 17B, in the step device 41 of the embodiment, when the movable step 42 is in the retracted position P1, each support arm 44 is disposed such that the base end part 44*b* thereof extends from the first pivot-joint point M1 relative to the vehicle body 2 toward the vehicle front side. As the movable step 42 moves toward the outer side in the vehicle width direction in conjunction with opening of the sliding door 4, each support arm 44 turns in a counterclockwise direction in FIG. 17A and FIG. 17B around the first pivot-joint point M1 as a fulcrum, and as the movable step 42 moves toward the inner side in the vehicle width direction, each support arm 44 turns in a clockwise direction in FIG. 17A and FIG. 17B. Meanwhile, the base end-side arm 83 and the leading end-side arm 84 of the sub-arm 82 turn relatively to each other around the joint M3 so as to expand or contract the chevron-like bent shape. Thus, in the step device 41 of the embodiment, the second pivot-joint points M2 of the support arms 44 relative to the movable step 42 move in the vehicle front-rear direction while shifting in the vehicle width direction, which allows the movable step 42 to deploy and retract smoothly in conjunction with opening and closing of the sliding door 4 while being stably supported.

As shown in FIG. 6, the step device 41 of the embodiment includes a plurality of pressure bearing members 100 that is provided under the support arms 44, each between the first pivot-joint point M1 relative to the vehicle body 2 and the second pivot-joint point M2 relative to the movable step 42, so as to come into sliding contact with the support arm 44 and bear the load thereof.

Specifically, as shown in FIG. 19 to FIG. 21, the step device 41 of the embodiment includes pressure bearing members 101 that are each fixed to the bracket main body 85 of the support bracket 45 so as to come into sliding contact with the base end part 44b of the support arm 44 supported by the support bracket 45. In the step device 41 of the embodiment, the pressure bearing members 101 are provided so as to correspond to the respective support arms 44, namely the front main arm 81f and the sub-arm 82 supported by the front bracket 45f and the rear main arm 81r supported by the rear bracket 45r.

In the step device 41 of the embodiment, the pressure bearing members 101 have substantially the same shape and pressure bearing structure. For the convenience of illustration, therefore, an enlarged view and a sectional view of only the pressure bearing member 101 that is provided on the front bracket 45f so as to correspond to the front main arm 81f are shown in FIG. 20 and FIG. 21.

Figure 22A:
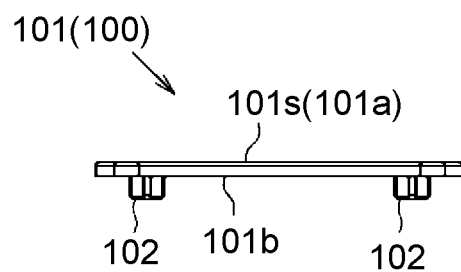
FIG. 22A is a side view of a pressure bearing member provided on the support bracket.
Figure 22B:
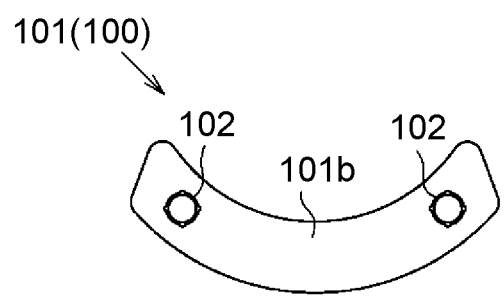
FIG. 22B is a bottom view of the pressure bearing member provided on the support bracket.

In particular, as shown in FIG. 22A and FIG. 22B, in the step device 41 of the embodiment, each pressure bearing member 101 has a form of a substantially arc-shaped flat plate. Each pressure bearing member 101 has, on a back surface 101b thereof, a pair of protruding fitting projections 102. As the fitting projections 102 are fitted into mounting holes 103 (see FIG. 19) on the side of the bracket main body 85, the pressure bearing member 101 is fixed to the bracket main body 85 under the support arm 44. Thus, as shown in FIG. 21, a front surface 101a of each pressure bearing member 101 of the embodiment forms a sliding contact surface 101s that comes into sliding contact with the base end part 44b of the support arm 44 located above the pressure bearing member 101.

More specifically, as shown in FIG. 20, each pressure bearing member 101 is disposed on a radially outer side of the first pivot-joint point M1 in such a state that the arc shape of the pressure bearing member 101 extends in a circumferential direction around the first pivot-joint point M1. Thus, in the step device 41 of the embodiment, each pressure bearing member 101 has the sliding contact surface 101s extending in a direction intersecting the corresponding support arm 44.

Figure 23:
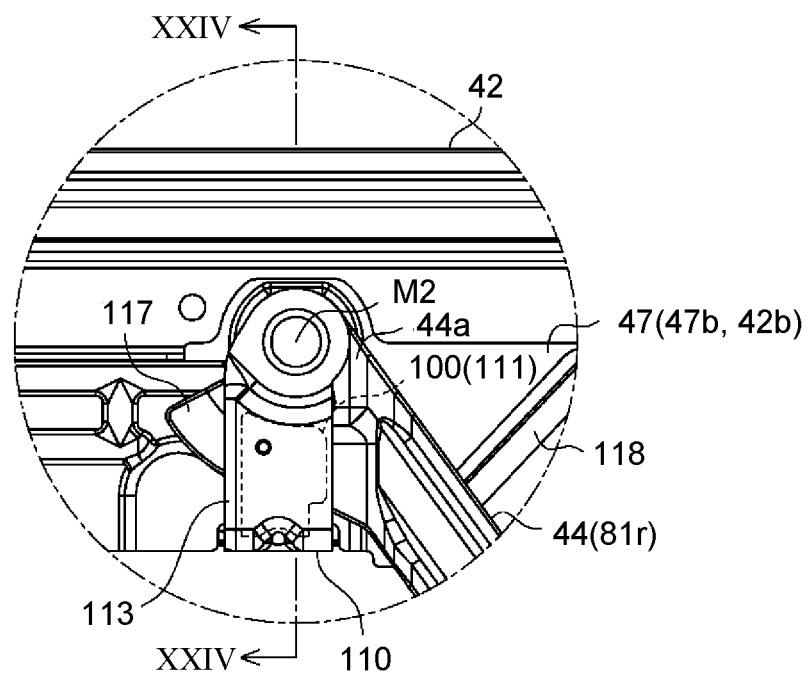
FIG. 23 is a bottom view around a second joint point of the support arm relative to the movable step.
Figure 24:
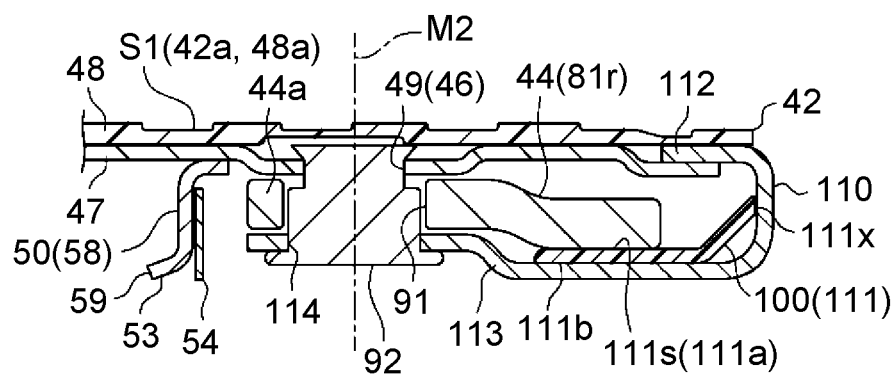
FIG. 24 is a sectional view around the second joint point of the support arm relative to the movable step.

As shown in FIG. 19, FIG. 23, and FIG. 24, in the step device 41 of the embodiment, the movable step 42 is provided with a plurality of holding members 110 that is each fixed to the movable base 47 so as to, together with the lower surface 47b of the movable base 47, hold the leading end part 44a of the support arm 44 at the coupling portion 46 for the support arm 44 provided in the movable base 47. The step device 41 of the embodiment includes a plurality of pressure bearing members 111 that is each provided for the holding member 110 so as to come into sliding contact with the leading end part 44a of the support arm 44 held by the holding member 110.

Figure 18:
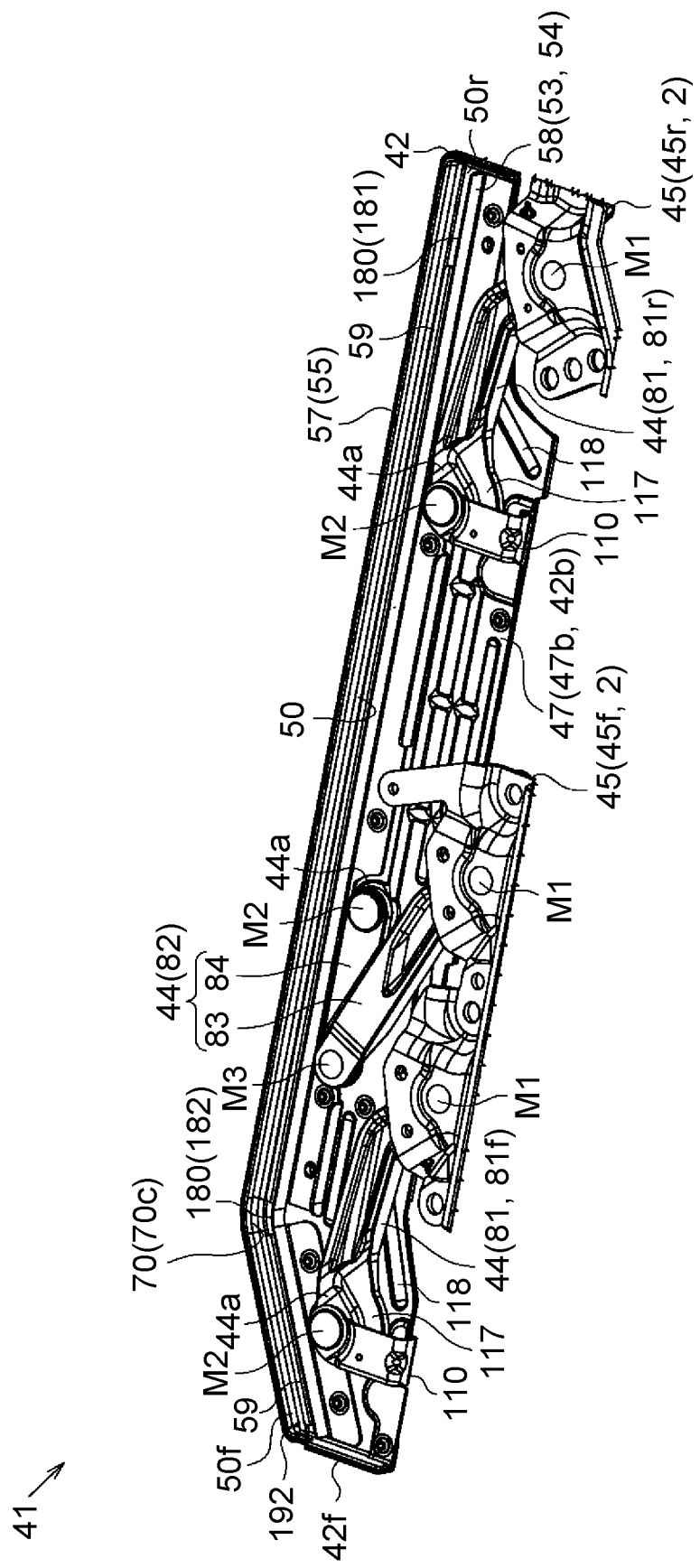
FIG. 18 is a perspective view of the movable step and support brackets that are coupled together through the support arms.

In particular, as shown in FIG. 17A, FIG. 17B, and FIG. 18, the movable step 42 of the embodiment is provided with a pair of front and rear holding members 110 that, together with the lower surface 47b of the movable base 47, hold the pair of front and rear main arms 81 that support the movable step 42 toward an upper side in a vehicle height direction (the left side in FIG. 18). The step device 41 of the embodiment includes a pair of pressure bearing members 111 provided one for each holding member 110.

In the step device 41 of the embodiment, the holding members 110 have the same shape and holding structure. For the convenience of illustration, therefore, an enlarged view and a sectional view of only the holding member 110 that corresponds to the rear main arm 81r are shown in FIG. 23 and FIG. 24.

Specifically, as shown in FIG. 19, FIG. 23, and FIG. 24, the holding member 110 of the embodiment has a form of a curved plate with a substantially J-shaped cross-section, and includes a fixed part 112 that is fixed to the movable base 47 and a holding part 113 that extends substantially parallel to the fixed part 112. The holding member 110 has an insertion hole 114 extending through the holding part 113. In the step device 41 of the embodiment, the shaft member 92 constituting the second pivot-joint point M2 of the support arm 44 relative to the movable step 42 is inserted into the insertion hole 91 provided in the leading end part 44a of the support arm 44 and the insertion hole 49 provided in the movable base 47 via the insertion hole 114. Thus, each holding member 110 of the embodiment holds the leading end part 44a of the support arm 44 between the holding part 113 and the lower surface 47b of the movable base 47 at the coupling portion 46 of the movable base 47.

In the step device 41 of the embodiment, the holding member 110 is fixed to the movable step 42 as the fixed part 112 is welded to the upper surface 47a of the movable base 47. The holding part 113 of the holding member 110 is disposed on the side of the lower surface 47b of the movable base 47 so as to surround a peripheral edge portion of the movable base 47. Thus, in the step device 41 of the embodiment, the force with which the support arms 44 support the movable step 42, particularly the force with which the main arms 81 provided with the holding members 110 are supported is enhanced for the second pivot-joint point M2 relative to the movable step 42.

Figure 25A:
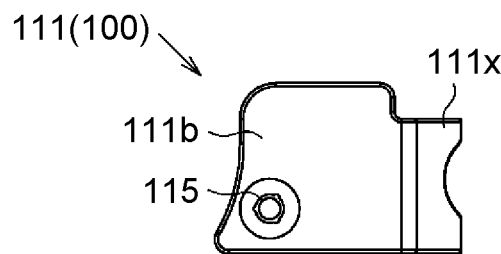
FIG. 25A is a bottom view of the pressure bearing member provided on a holding member that, together with the movable step, holds the support arm.
Figure 25B:
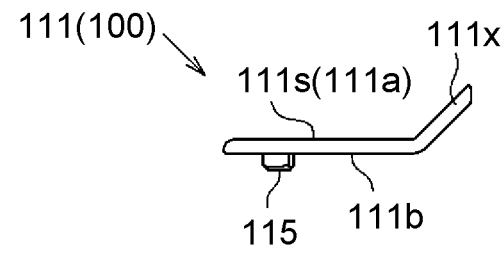
FIG. 25B is a side view of the pressure bearing member provided on the holding member that, together with the movable step, holds the support arm.

As shown in FIG. 25A and FIG. 25B, each pressure bearing member 111 of the embodiment has a form of a substantially rectangular flat plate with a bent portion 111x at one end. The pressure bearing member 111 has, on a back surface 111b thereof, a protruding fitting projection 115. As the fitting projection 115 is fitted into a mounting hole 116 provided in the holding part 113 of the holding member 110 (see FIG. 19), the pressure bearing member 111 is fixed to the holding member 110 under the support arm 44. Thus, as shown in FIG. 24, the front surface 111a of the pressure bearing member 111 of the embodiment forms a sliding contact surface 111s that comes into sliding contact with the leading end part 44a of the support arm 44 located on the upper side of the pressure bearing member 111.

More specifically, as shown in FIG. 19 and FIG. 23, each main arm 81 of the embodiment has a substantially fan-shaped flat plate part 117 at a part with which the pressure bearing member 111 comes into sliding contact. Thus, in the step device 41 of the embodiment, the area of contact between each main arm 81 and the pressure bearing member 111 is increased to thereby enhance the force with which the main arm 81 supports the movable step 42.

In the step device 41 of the embodiment, the pressure bearing members 100, namely, the pressure bearing members 101 on the side of the first pivot-joint points M1 provided on the support brackets 45 and the pressure bearing members 111 on the side of the second pivot-joint points M2 provided on the holding members 110, are each made of a resin having a shock absorbing property and a self-lubricating property. Examples of a resin material having these properties include polyacetal (POM). Thus, in the step device 41 of the embodiment, the support arms 44 can turn smoothly and, at the same time, sliding noise thereof is reduced.

Figure 26A:
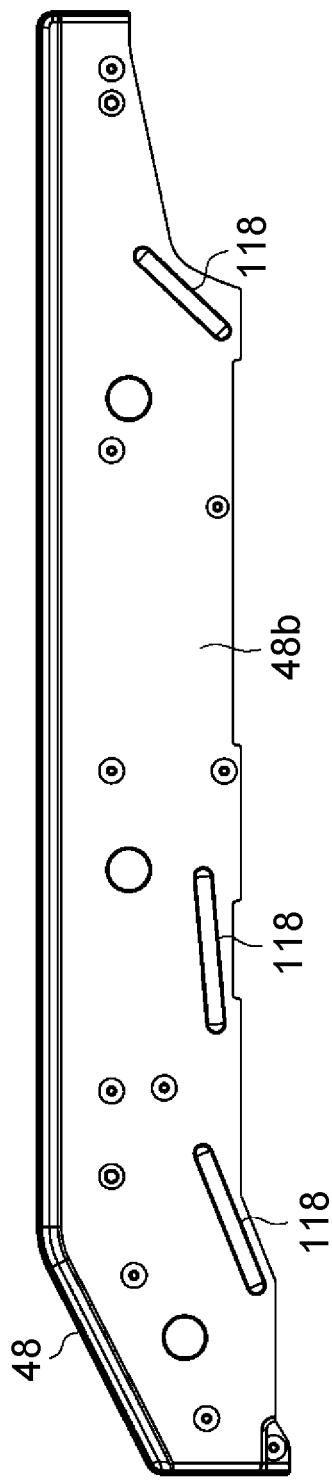
FIG. 26A is a bottom view of a resin cover constituting a part of the movable step.
Figure 26B:
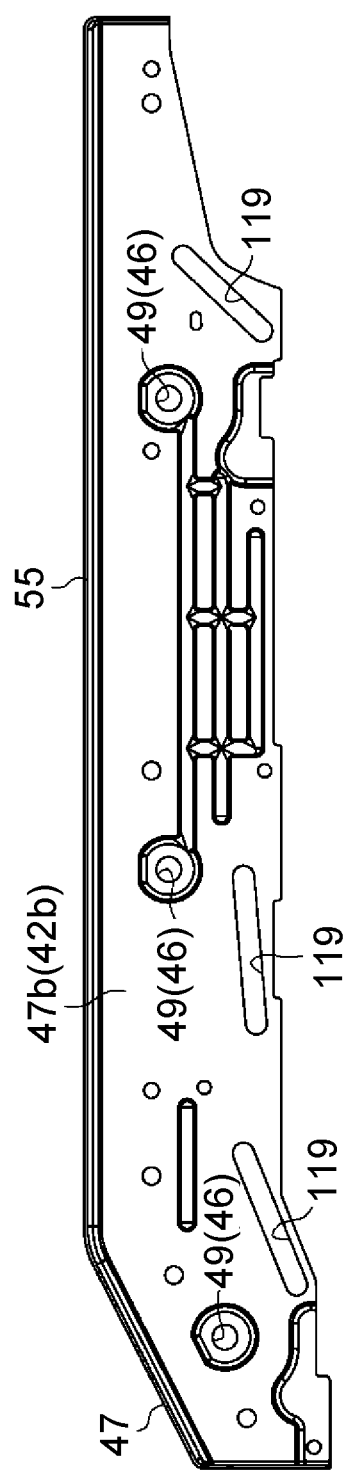
FIG. 26B is a bottom view of a movable base constituting a part of the movable step.
Figure 27:
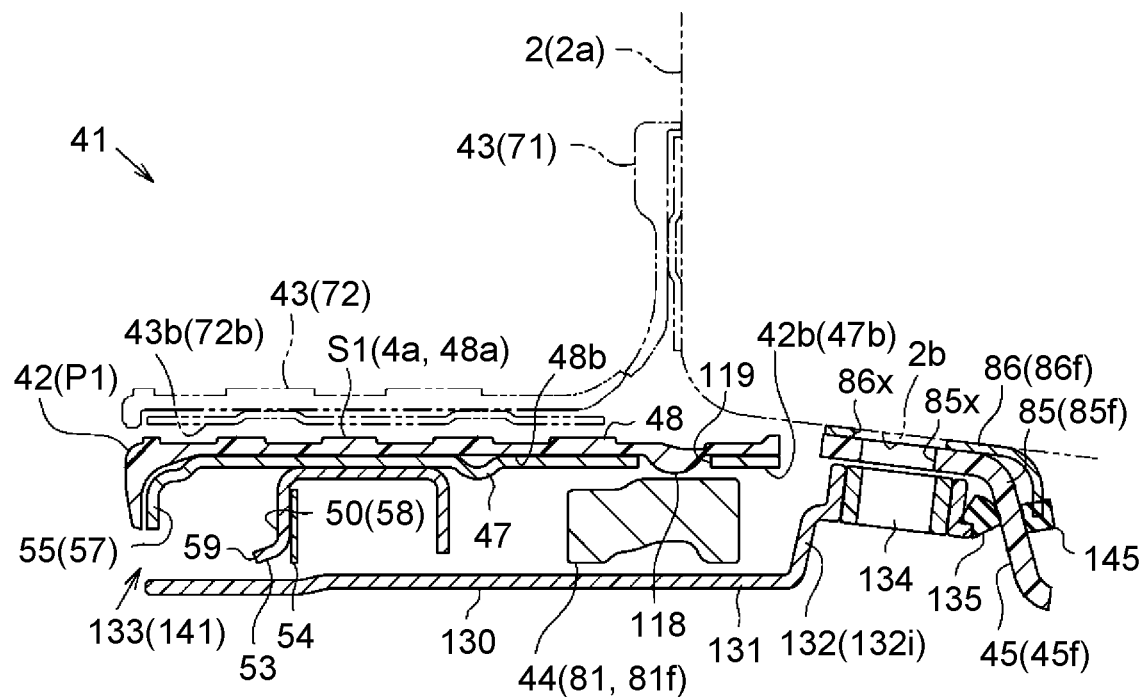
FIG. 27 is a sectional view of the step device in a state where the movable step is in a retracted position.

As shown in FIG. 26A, FIG. 26B, and FIG. 27, in the step device 41 of the embodiment, the lower surface 42b of the movable step 42 is provided with a plurality of ridges 118 that extends in directions intersecting the support arms 44 located under the movable step 42 and comes into sliding contact with the support arms 44.

As shown in FIG. 7, the movable step 42 of the embodiment includes three ridges 118 corresponding to the front main arm 81f, the sub-arm 82, and the rear main arm 81r. The ridges 118 extend in a longitudinal direction of the movable step 42 that extends in the vehicle front-rear direction.

As shown in FIG. 26A, FIG. 26B, and FIG. 27, in the movable step 42 of the embodiment, the ridges 118 are provided on the lower surface 48b of the resin cover 48. The movable base 47 has elongated holes 119 at positions under the respective ridges 118. In the movable step 42 of the embodiment, the ridges 118 inserted into the respective holes 119 protrude toward the lower surface 47b of the movable base 47 constituting the lower surface 42b of the movable step 42.

In the movable step 42 of the embodiment, the ridges 118 come into sliding contact with the support arms 44 located under the ridges 118, so that the support arms 44 can stably support the load of the movable step 42. In the step device 41 of the embodiment, the ridges 118 extend in directions intersecting the support arms 44, which reduces the area of contact between each ridge 118 and the corresponding support arm 44. Thus, in the movable step 42 of the embodiment, the support arms 44 can turn smoothly and, at the same time, sliding noise thereof is reduced.

As shown in FIG. 17A and FIG. 17B, the step device 41 of the embodiment includes stoppers 120 that restrict the movable range of the movable step 42 by coming into contact with the support arms 44. In particular, the step device 41 of the embodiment includes, as the stoppers 120, a first stopper 121 provided on the front bracket 45f and a second stopper 122 provided on the rear bracket 45r. The first stopper 121 restricts turning of the front main arm 81f by coming into contact with the front main arm 81f when the movable step 42 moves toward the inner side in the vehicle width direction and reaches the retracted position P1. The second stopper 122 restricts turning of the rear main arm 81r by coming into contact with the rear main arm 81r when the movable step 42 moves toward the outer side in the vehicle width direction and reaches the deployed position P2. By thus restricting the movable range of the movable step 42, the step device 41 of the embodiment prevents the chevron-like bent shape of the sub-arm 82 from becoming inverted.

Protective Cover

Next, the configuration of a protective cover provided in the step device 41 of the embodiment will be described.

As shown in FIG. 6 and FIG. 27 to FIG. 30, the step device 41 of the embodiment includes a cover member 130 that is fixed to the lower surface 2b of the vehicle body 2 so as to cover lower sides of the support arms 44.

Specifically, the cover member 130 of the embodiment includes a bottom wall 131 that is disposed under the support arms 44 and a peripheral wall 132 that is erected at edges of the bottom wall 131 so as to extend upward toward the lower surface 2b of the vehicle body 2. In the cover member 130 of the embodiment, the bottom wall 131 is formed to be large enough to cover the lower sides of support arms 44 when the movable step 42 is in the retracted position P1. The peripheral wall 132 is erected at the edges of the bottom wall 131 so as to extend on the vehicle front side, the inner side in the vehicle width direction, and the vehicle rear side of the cover member 130. Thus, the cover member 130 of the embodiment forms a housing space 133 opening toward the outer side in the vehicle width direction, at a lower level than the lower surface 2b of the vehicle body 2.

In particular, the cover member 130 of the embodiment is fastened along with the support brackets 45 of the support arms 44 to the lower surface 2b of the vehicle body 2 by means of fastening portions 134 that are integrally formed in the peripheral wall 132. In the vehicle 1 of the embodiment, the cover member 130 forms the housing space 133 together with the lower surface 2b of the vehicle body 2 and the lower surface 43b of the sub-step 43, both located above the cover member 130. Thus, in the step device 41 of the embodiment, when the movable step 42 is in the retracted position P1, the substantially entire movable step 42 is housed along with the support arms 44 inside the housing space 133 formed by the cover member 130.

More specifically, as shown in FIG. 27 to FIG. 30, the cover member 130 of the embodiment includes a seal member 135 that is interposed between the peripheral wall 132 and the vehicle body 2. In particular, the seal member 135 of the embodiment has a string-like outer shape with a substantially quadrangular cross-section. In the cover member 130 of the embodiment, the seal member 135 having such an outer shape is divided into parts and fixed to a leading end of the peripheral wall 132 erected at the edges of the bottom wall 131.

Figure 30:
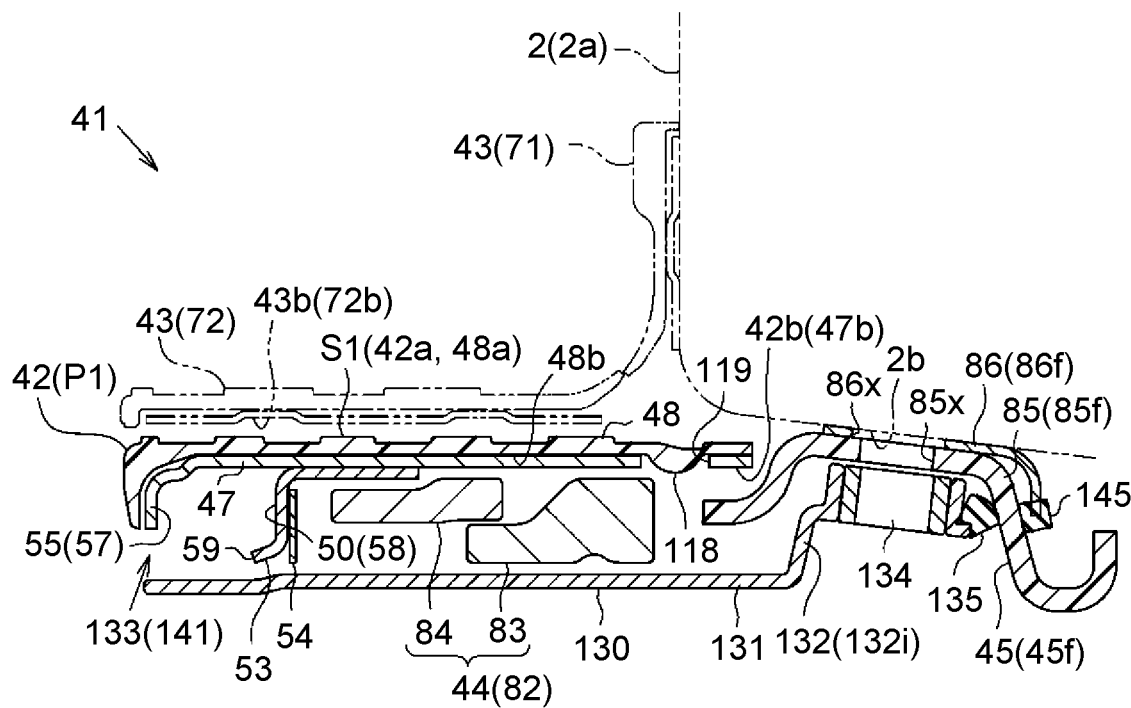
FIG. 30 is a sectional view of the step device in the state where the movable step is in the retracted position.
Figure 31:
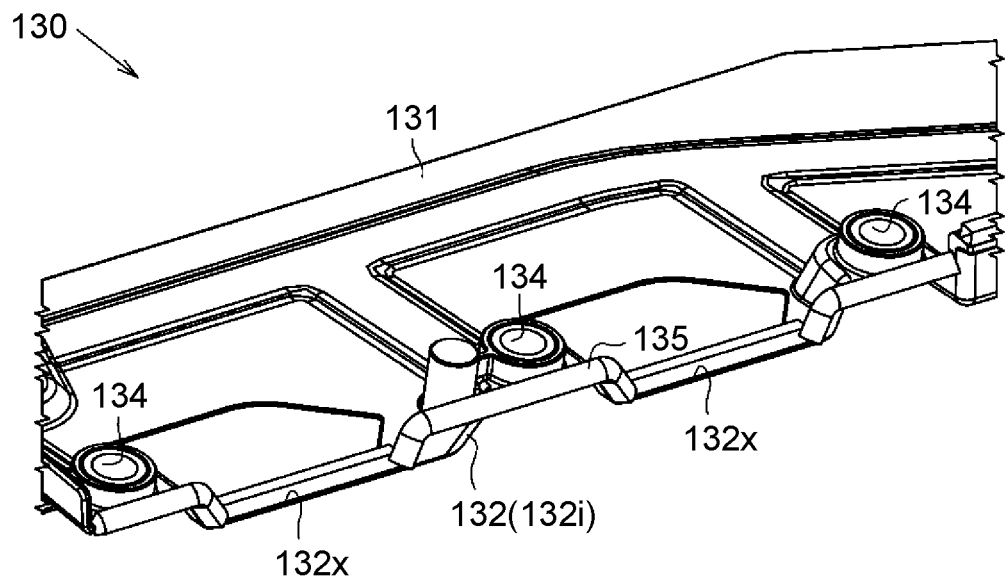
FIG. 31 is a perspective view of the cover member with the seal member fixed at a leading end of a peripheral wall.
Figure 32:
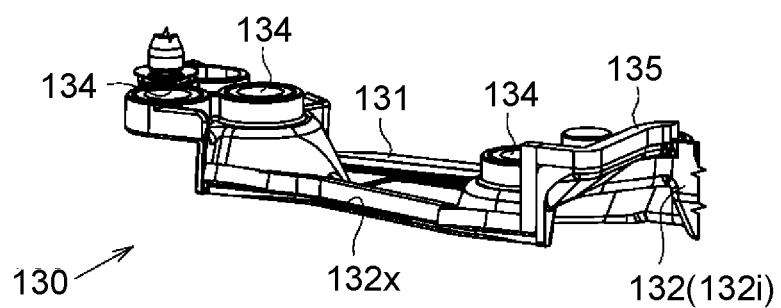
FIG. 32 is a perspective view of the cover member with the seal member fixed at the leading end of the peripheral wall.

In particular, as shown in FIG. 31 and FIG. 32, the cover member 130 of the embodiment has a plurality of notches 132x that is provided in a peripheral wall part 132i on the inner side in the vehicle width direction to avoid interference with the support brackets 45 of the support arms 44. In the cover member 130 of the embodiment, the seal member 135 is provided also at the notches 132x along the edge of the bottom wall 131 continuously from the peripheral wall part 132i by having its string-like shape bent into a substantially square-U-shape. Thus, as shown in FIG. 27 and FIG. 30, in the cover member 130 of the embodiment, the seal member 135 is interposed also between the support bracket 45 and the peripheral wall part 132i.

Figure 33:
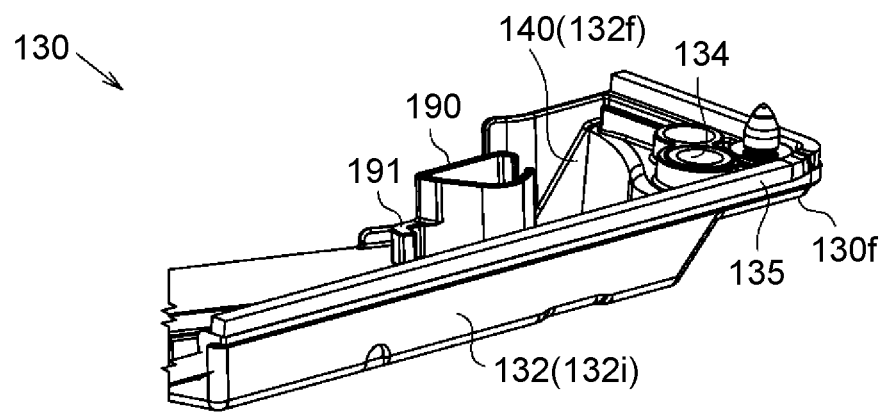
FIG. 33 is a perspective view of the cover member with the seal member fixed at the leading end of the peripheral wall.

As shown in FIG. 33, in the cover member 130 of the embodiment, the seal member 135 is provided also at a corner between the peripheral wall part 132i on the inner side in the vehicle width direction and a peripheral wall part 132f on the vehicle front side along the edge of the bottom wall 131 by having its string-like shape bent into a substantially L-shape. Thus, in the step device 41 of the embodiment, foreign objects, such as dust or mud water, are kept from entering the housing space 133 formed by the cover member 130 through a gap between the peripheral wall 132 of the cover member 130 and the lower surface 2b of the vehicle body 2.

Figure 34:
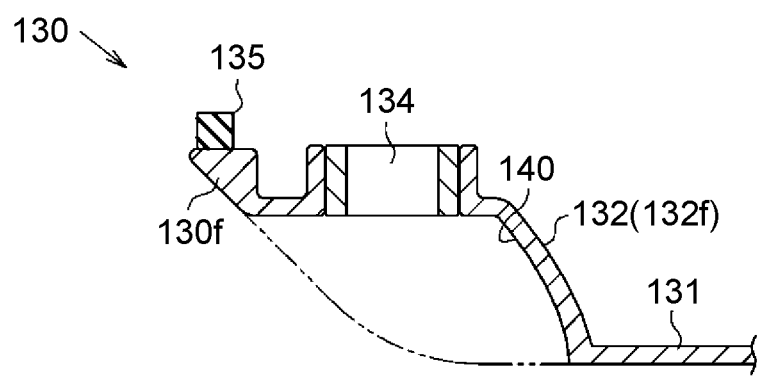
FIG. 34 is a sectional view of a vehicle front-side peripheral wall part that is provided at a front end portion of the cover member.

As shown in FIG. 33 and FIG. 34, in the cover member 130 of the embodiment, a sloping surface 140 that slopes downward while extending from the vehicle front side toward the vehicle rear side is provided at the vehicle front-side peripheral wall part 132f that is provided at a front end portion 130f of the cover member 130. The long dashed double-short dashed line in FIG. 34 indicates the shape of the sloping surface 140 at a part where the fastening portion 134 is not provided. Based on the shape of the sloping surface 140, the cover member 130 of the embodiment mitigates the impact of foreign objects that, while the vehicle is running, collide from the vehicle front side with the peripheral wall part 132f provided at the front end portion 130f, such as small stones kicked up by a tire of the vehicle 1.

In the vehicle 1 of the embodiment, when the movable step 42 is in the retracted position P1, an opening 141 of the housing space 133 facing the outer side in the vehicle width direction is closed with a decorative member 142 (see FIG.

6) provided at a lower end of the sliding door 4. Thus, the step device 41 of the embodiment prevents foreign objects from entering the housing space 133 through the open part on the outer side in the vehicle width direction while the vehicle 1 is running.

Figure 28:
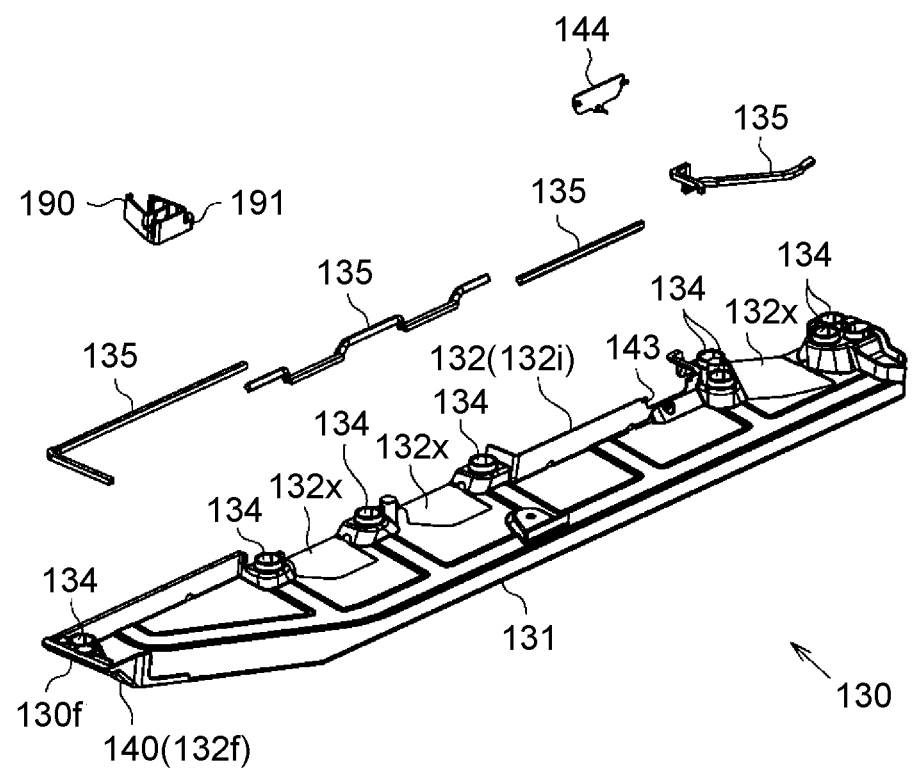
FIG. 28 is a perspective view of a cover member, a seal member, and a retaining member.

As shown in FIG. 28, the cover member 130 of the embodiment includes a fitting member 144 that is fitted into a window 143 provided in the peripheral wall part 132*i* on the inner side in the vehicle width direction and thereby integrated with the peripheral wall part 132*i* in a state of closing the window 143. In the step device 41 of the embodiment, the fitting member 144 can be removed to maintain the support arms 44 disposed inside the housing space 133 through the window 143.

Further, as shown in FIG. 6, FIG. 21, FIG. 27, and FIG. 30, the step device 41 of the embodiment includes a seal member 145 that is interposed between the bracket main body 85 and the holding member 86 composing the support bracket 45 of each support arm 44. In particular, in the step device 41 of the embodiment, the seal member 145 has a string-like outer shape with a substantially quadrangular cross-section, like the seal member 135 interposed between the peripheral wall 132 of the cover member 130 and the lower surface 2*b* of the vehicle body 2. In the step device 41 of the embodiment, the seal member 145 is disposed so as to surround the base end part 44*b* of each support arm 44 held between the bracket main body 85 and the holding member 86 such that foreign objects are kept from entering the first pivot-joint point M1 of the support arm 44 relative to the support bracket 45.

As shown in FIG. 6, in the step device 41 of the embodiment, the cover member 130 is disposed at a higher level than a lower end 150*b* of a rocker flange 150 that is provided on the lower surface 2*b* of the vehicle body 2. Thus, in the step device 41 of the embodiment, the cover member 130 does not get in the way of lifting up the vehicle 1 using the rocker flange 150.

Coupling Structure of Guide Roller Unit

Next, the structure of coupling the guide roller unit 52 to the guide rail 50 in the step device 41 of the embodiment will be described.

Figure 35A:
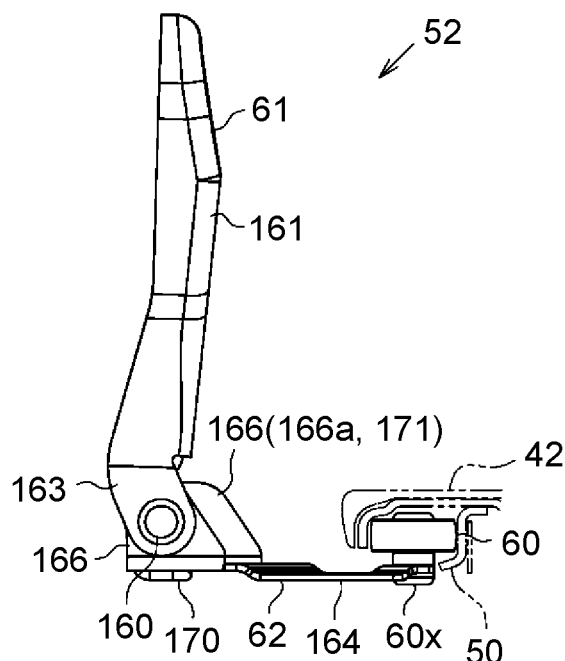
FIG. 35A is a side view of a guide roller unit.
Figure 35B:
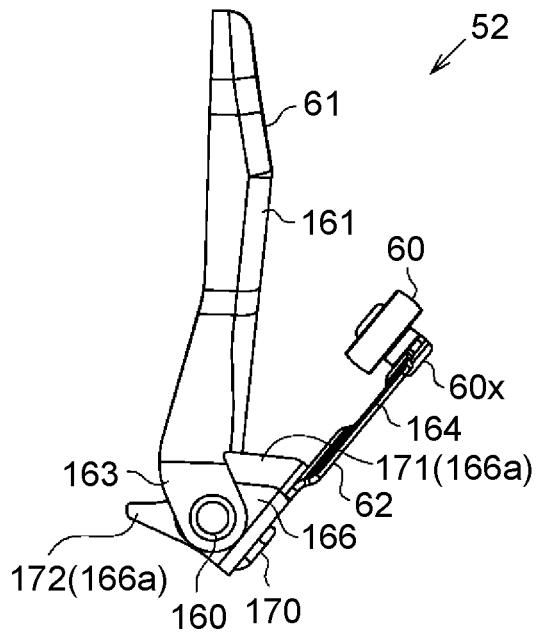
FIG. 35B is a side view of the guide roller unit.

As shown in FIG. 10, FIG. 35A, and FIG. 35B, the guide roller unit 52 as a coupling member in the step device 41 of the embodiment has a structure in which the fixed member 61 that is fixed to the sliding door 4 and the arm member 62 that supports, at a leading end thereof, the guide roller 60 as the engaging part engaged with the guide rail 50 are turnably coupled together through a shaft member 160.

In particular, in the guide roller unit 52 of the embodiment, the fixed member 61 includes a main body 161 that is fixed to the sliding door 4 in a state of extending in the up-down direction, and a pair of opposite walls 163 that are provided at a lower end portion of the main body 161 and face each other. The arm member 62 includes a main body 164 that has a substantially flat-plate-like outer shape, and a pair of opposite walls 166 that are provided on a base end side of the main body 164 and face each other. In the guide roller unit 52 of the embodiment, the opposite walls 163 on the side of the fixed member 61 and the opposite walls 166 on the side of the arm member 62 have insertion holes 167, 168, respectively, formed at such positions as to face each other. In the guide roller unit 52 of the embodiment, the fixed member 61 and the arm member 62 are turnably coupled together as the shaft member 160 is inserted into the insertion holes 167, 168.

The guide roller unit 52 of the embodiment is provided with a helical torsion spring 170 that is interposed between the fixed member 61 and the arm member 62, with the shaft member 160 inserted in the helical torsion spring 170. In the guide roller unit 52 of the embodiment, based on an elastic force of the helical torsion spring 170 as an urging member, an urging force in the direction of lifting upward the guide roller 60 supported at the leading end of the arm member 62 is applied to the arm member 62 in a state where the fixed member 61 is fixed to the sliding door 4.

As shown in FIG. 35A, when the guide roller unit 52 of the embodiment is in a state of being coupled to the guide rail 50 provided on the movable step 42, the guide roller 60 is supported inside the guide rail 50 with a leading end side of the arm member 62 lifted upward based on the urging force of the helical torsion spring 170.

As shown in FIG. 35B, when the guide roller unit 52 of the embodiment is in an uncoupled state where the guide roller 60 is separated from the guide rail 50, the arm member 62 turns further such that the leading end side thereof supporting the guide roller 60 comes closer to the main body 161 of the fixed member 61 based on the urging force of the helical torsion spring 170. Thus, in the step device 41 of the embodiment, the guide roller unit 52 can be compactly folded, so that work efficiency in the uncoupled state is increased and, at the same time, the guide roller unit 52 does not get in the way of an occupant using the sliding door 4.

As shown in FIG. 10, FIG. 35A, and FIG. 35B, the guide roller unit 52 of the embodiment has a stopper 171 that is integrally provided on the opposite wall 166*a* of the arm member 62. When the guide roller unit 52 is in the uncoupled state, the stopper 171 comes into contact with the main body 161 of the fixed member 61 as the arm member 62 turns based on the urging force of the helical torsion spring 170. Thus, in the guide roller unit 52 of the embodiment, the amount of turning of the arm member 62 is restricted such that the arm member 62 urged by the helical torsion spring 170 and the guide roller 60 supported by the arm member 62 do not interfere with the sliding door 4.

As shown in FIG. 7, FIG. 8, FIG. 18, and FIG. 36, the guide rail 50 of the embodiment has notches 180 formed by cutting out portions of the fall prevention flange 59 provided at the lower end of the side wall 58. In the step device 41 of the embodiment, the notches 180 can be used to insert and remove the guide roller 60 of the guide roller unit 52 supported by the sliding door 4 into and from the guide rail 50 provided on the lower surface 42*b* of the movable step 42.

Figure 36:
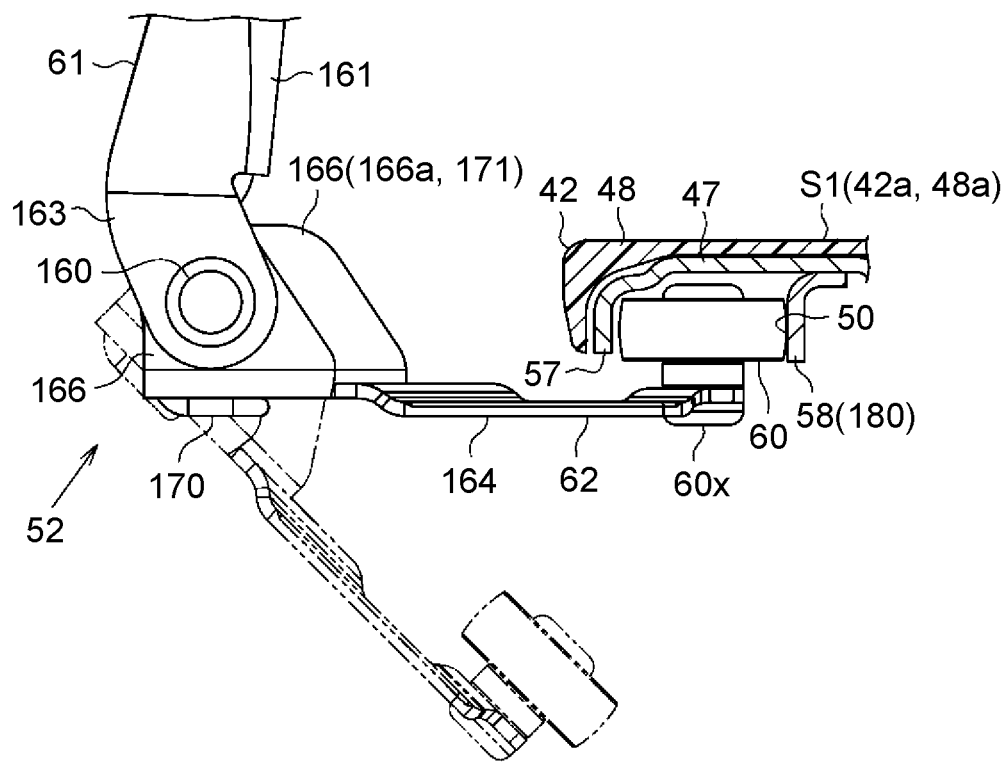
FIG. 36 is a view illustrating actions of inserting and removing the guide roller unit into and from a guide rail.
Figure 37:
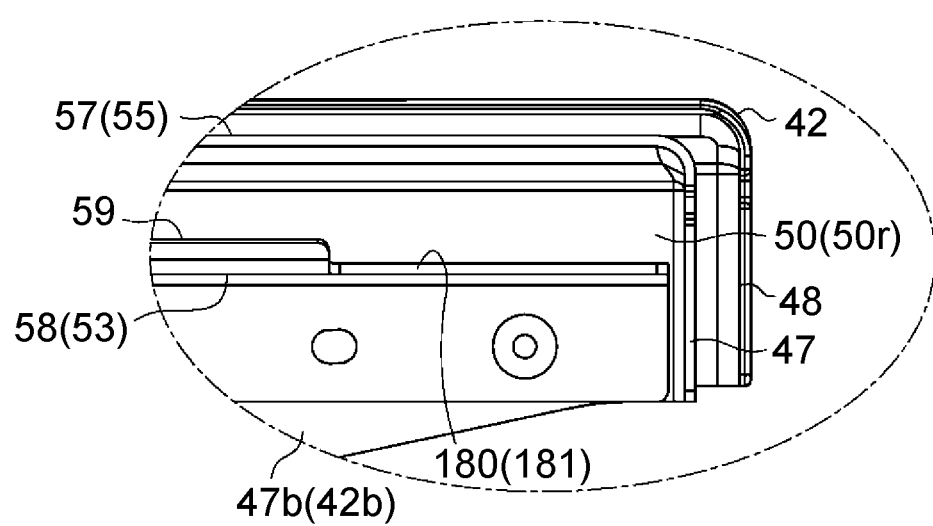
FIG. 37 is a bottom view of the guide rail showing a notch provided at a longitudinal end portion on a vehicle rear side.
Figure 38:
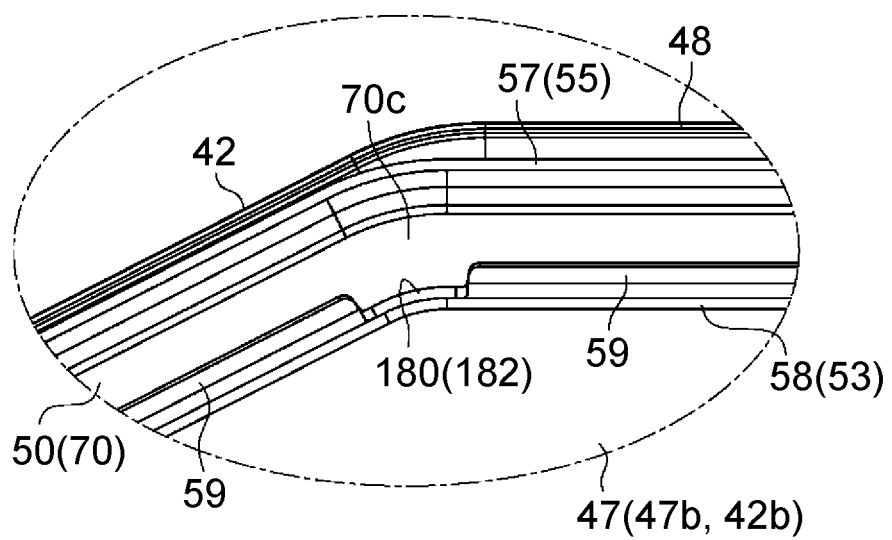
FIG. 38 is a bottom view of the guide rail showing a notch provided at a corner of a curved portion.

As shown in FIG. 36, at longitudinal positions at which the notches 180 are provided, the guide rail 50 of the embodiment allows the guide roller 60 to move in the up-down direction beyond the fall prevention flange 59 provided at the lower end of the side wall 58. Further, in the guide roller unit 52 of the embodiment, the arm member 62 can be pressed downward so as to turn against the urging force of the helical torsion spring 170. In the guide roller unit 52 of the embodiment, meanwhile, a stopper 172 (see FIG. 10) integrally provided on the opposite wall 166*a* of the arm member 62 comes into contact with the main body 161 of the fixed member 61 and thereby restricts the amount of turning of the arm member 62 in the downward pressing direction. In the guide roller unit 52 of the embodiment, when this downward pressing force is removed, the arm member 62 can be turned again based on the urging force of the helical torsion spring 170.

Thus, in the step device 41 of the embodiment, the notches 180 provided in the guide rail 50 can be used to insert the guide roller 60 provided at the leading end of the arm member 62 into the guide rail 50 from below by turning the arm member 62 based on the urging force of the helical torsion spring 170. Moreover, the guide roller 60 supported inside the guide rail 50 can be separated downward from the guide rail 50 by turning the arm member 62 against the urging force of the helical torsion spring 170. Thus, in the step device 41 of the embodiment, the sliding door 4 supporting the guide roller unit 52 and the movable step 42 provided with the guide rail 50 can be easily coupled to and uncoupled from each other.

Specifically, as shown in FIG. 7, FIG. 8, FIG. 18, and FIG. 37, the guide rail 50 of the embodiment includes a notch 181 provided at a longitudinal end portion 50r on the vehicle rear side where the guide roller 60 is located when the sliding door 4 is fully opened. Thus, in the step device 41 of the embodiment, the sliding door 4 and the movable step 42 can be coupled to and uncoupled from each other in a state where a sufficient working space is easy to secure owing to the movable step 42 being disposed in the deployed position P2 on the outer side in the vehicle width direction and the sliding door 4 being fully opened.

As shown in FIG. 7, FIG. 8, FIG. 18, and FIG. 38, the guide rail 50 of the embodiment has a notch 182 provided at a longitudinal position on the vehicle front side relative to the notch 181. In particular, the notch 182 is formed at a corner 70c provided farthest on the vehicle rear side in the curved portion 70 that is provided at the longitudinal end portion 50f on the vehicle front side. Thus, in the step device 41 of the embodiment, also when the sliding door 4 is located near the fully closed position Pc, the sliding door 4 and the movable step 42 can be coupled to and uncoupled from each other in a state where a working space is easy to secure owing to the sliding door 4 having shifted toward the outer side in the vehicle width direction by opening and the movable step 42 having moved toward the outer side in the vehicle width direction.

The step device 41 of the embodiment includes a retaining member 190 that retains the movable step 42 in the retracted position P1 on the inner side in the vehicle width direction when the guide roller 60 is separated from the guide rail 50, i.e., the sliding door 4 and the movable step 42 are uncoupled from each other.

As shown in FIG. 28, FIG. 29A, FIG. 29B, and FIG. 33, in the step device 41 of the embodiment, the retaining member 190 is provided on the cover member 130 forming the housing space 133 when the movable step 42 is in the retracted position P1. In particular, the retaining member 190 of the embodiment is provided on the bottom wall 131, near the front end portion 130f of the cover member 130. The retaining member 190 has a hook-shaped engaging projection 191. The retaining member 190 of the embodiment retains the movable step 42 in the retracted position P1 by having the engaging projection 191 engaged with the movable step 42.

Specifically, as shown in FIG. 39A and FIG. 39B, the retaining member 190 of the embodiment is turnably coupled to the bottom wall 131 of the cover member 130. In the step device 41 of the embodiment, turning the cover member 130 around a support shaft 190x can switch between a used state where the engaging projection 191 does not engage with the movable step 42 and a retained state where the engaging projection 191 engages with the movable step 42 disposed in the retracted position P1.

In particular, as shown in FIG. 39A, in the used state where the movable step 42 is moved in the vehicle width direction in conjunction with the sliding door 4, the retaining member 190 of the embodiment is kept in a state where the engaging projection 191 faces the outer side in the vehicle width direction. Thus, in the step device 41 of the embodiment, the engaging projection 191 of the retaining member 190 does not interfere with the movable step 42 that moves in the vehicle width direction.

As shown in FIG. 39B, in the step device 41 of the embodiment, when the movable step 42 uncoupled from the sliding door 4 is to be retained in the retracted position P1, the retaining member 190 is turned in a counterclockwise direction in FIG. 39A and FIG. 39B, so that the engaging projection 191 faces the vehicle rear side where the movable step 42 is disposed. In the step device 41 of the embodiment, as the retaining member 190 thus turns, the engaging projection 191 is inserted into an engaging recess 192 provided at a front end portion 42f of the movable step 42.

In the step device 41 of the embodiment, the engaging projection 191 of the retaining member 190 inserted into the engaging recess 192 of the movable step 42 is disposed inside the guide rail 50 at the longitudinal end portion 50f on the vehicle front side. Thus, the step device 41 of the embodiment can retain the movable step 42 in the retracted position P1 as the retaining member 190 engages with the movable step 42.

Next, effects of the embodiment will be described. The step device 41 includes the movable step 42 that is supported under the door opening 3, and the guide roller unit 52 as the coupling member that, in the state of being supported by the sliding door 4, engages with the movable step 42 to move the movable step 42 in the vehicle width direction in conjunction with opening and closing of the sliding door 4. The step device 41 includes the support arms 44 that each have the first pivot-joint point M1 relative to the vehicle body 2 and the second pivot-joint point M2 relative to the movable step 42, and support the movable step 42 toward the upper side. The step device 41 further includes the pressure bearing members 100 that are each provided at a position between the first pivot-joint point M1 relative to the vehicle body 2 and the second pivot-joint point M2 relative to the movable step 42 and bear the load of the support arm 44 by coming into sliding contact with the support arm 44.

In this configuration, each pressure bearing member 100 supports the load of the support arm 44, so that the load of the movable step 42 supported by the support arm 44 is less likely to concentrate at the first pivot-joint point M1 of the support arm 44 relative to the vehicle body 2 and the second pivot-joint point M2 of the support arm 44 relative to the movable step 42. Thus, higher supporting rigidity can be secured.

The step device 41 has the support brackets 45 that are each fixed to the vehicle body 2 to form the first pivot-joint point M1 of the support arm 44 relative to the vehicle body 2, and the pressure bearing members 101 that are each provided on the support bracket 45.

In this configuration, each pressure bearing member 101 provided on the support bracket 45 supports the load of the support arm 44, so that the load of the movable step 42 supported by the support arm 44 is less likely to concentrate at the first pivot-joint point M1 of the support arm 44 relative to the vehicle body 2. Thus, higher supporting rigidity can be secured.

The step device 41 includes the holding members 110 that are each fixed to the movable step 42 so as to hold, together with the movable step 42, the support arm 44 at the second pivot-joint point M2 thereof relative to the movable step 42, and the pressure bearing members 111 that are each provided on the holding member 110.

In this configuration, each holding member 110 holds, together with the movable step 42, the support arm 44, which increases the supporting rigidity of the support arm 44 at the second pivot-joint point M2 thereof relative to the movable step 42. Further, each pressure bearing member 111 provided on the holding member 110 supports the load of the support arm 44, so that the load of the movable step 42 is less likely to concentrate at the second pivot-joint point M2. Thus, higher supporting rigidity can be secured.

The pressure bearing members 101 provided on the support brackets 45 have an outer form of a substantially arc-shaped flat plate. The pressure bearing members 101 are each disposed on the radially outer side of the first pivot-joint point M1 in such a state that the arc shape of the pressure bearing member 101 extends in the circumferential direction around the first pivot-joint point M1.

In this configuration, each pressure bearing member 101 forms the sliding contact surface 101s extending in a direction intersecting the support arm 44. As a result, the pressure bearing member 101 can be stably brought into sliding contact with the support arm 44 that turns around the first pivot-joint point M1 as a fulcrum. Thus, higher supporting rigidity can be secured.

The pressure bearing members 100 are made of a resin having a shock absorbing property and a self-lubricating property. This configuration makes it possible to ensure smooth turning of the support arms 44 by absorbing a shock load of the movable step 42 transmitted to the support arms 44 and, at the same time, to reduce the sliding sound of the support arms 44.

The ridges 118 that each extend in a direction intersecting the support arm 44 and come into sliding contact with the support arm 44 is provided on the lower surface 42b of the movable step 42. In this configuration, each ridge 118 provided on the movable step 42 comes into sliding contact with the support arm 44 located under the ridge 118, so that the load of the movable step 42 can be stably supported. Further, as the ridge 118 extends in a direction intersecting the support arm 44, the area of contact between the ridge 118 and the support arm 44 can be reduced. Thus, it is possible to ensure smooth turning of the support arms 44 and, at the same time, to reduce the sliding sound of the support arms 44.

The movable step 42 includes the movable base 47 having the coupling portions 46 for the support arms 44, and the resin cover 48 that is fixed to the movable base 47 to be the step surface S1. The ridges 118 are each provided on the lower surface 48b of the resin cover 48 and protrude toward the side of the lower surface 42b of the movable step 42 through the hole 119 provided in the movable base 47.

This simple configuration makes it possible to impart a shock absorbing property and a self-lubricating property to the ridges 118 while securing the strength of the movable base 47. Thus, smoother turning of the support arms 44 can be ensured.

The step device 41 includes, as the support arms 44, the two main arms 81 that are provided at positions apart from each other in the vehicle front-rear direction, and the sub-arm 82 that has the joint M3 at which the sub-arm 82 is bendable and that is provided at a position apart from each main arm 81.

In this configuration, the bent shape of the sub-arm 82 having the joint M3 changes such that the turning sub-arm 82 does not interfere with each turning main arm 81. Thus, the number of the support arms 44 can be increased to enhance the supporting rigidity for the movable step 42, while smooth movement of the movable step 42 is ensured.

The sub-arm 82 is provided between the main arms 81. In this configuration, the two main arms 81 can be disposed a greater distance apart from each other in the vehicle front-rear direction. Thus, the movable step 42 can be more stably supported.

The step device 41 includes the stoppers 120 that restrict the movable range of the movable step 42 by coming into contact with the support arms 44. In this configuration, the movable step 42 supported by the support arms 44 can be appropriately moved in the vehicle width direction between the retracted position P1 and the deployed position P2. Thus, the quality of the movable step 42 can be enhanced. Moreover, the sub-arm 82 can be prevented from turning excessively and inverting its bent shape. Thus, high reliability can be ensured.

The above embodiment can be implemented with changes made thereto as follows. The embodiment and the following modified examples can be implemented in combination within such a range that no technical inconsistency arises.

In the above embodiment, the present disclosure is implemented as the step device 41 that operates in conjunction with the rearward opening sliding door 4 that opens toward the vehicle rear side. However, the disclosure may instead be applied to a frontward opening sliding door 4 that opens toward the vehicle front side.

In the above embodiment, the sliding door 4 is opened and closed by being driven by the power sliding door device 31. However, the disclosure may instead be applied to a sliding door 4 that does not have such a power sliding door device 31.

In the above embodiment, the power sliding door device 31 functions as the catching detection device 32 that detects whether any object is caught in the sliding door 4 based on changes in the force required to open and close the sliding door 4. As one example of this detection, the power sliding door device 31 determines that an object is caught in the sliding door 4 when the amount of current to the motor 31m increases beyond a predetermined threshold value while the sliding door 4 is driven to open or close. However, the present disclosure is not limited to this example, and detection of whether any object is caught in the sliding door 4 may instead be based on changes in rotation of the motor 31m. Further, the disclosure may be applied to a sliding door 4 provided with a catching detection device 32 independent of the power sliding door device 31, as long as the catching detection device 32 executes detection of whether any object is caught in the sliding door 4 based on changes in the force required to open or close the sliding door 4. In addition, the disclosure may be applied to a sliding door 4 that is not provided with such a catching detection device 32.

In the above embodiment, the movable step 42 moves in the vehicle width direction while maintaining the substantially horizontal posture. However, the posture need not be necessarily horizontal and may instead be, for example, inclined downward toward the outer side in the vehicle width direction.

In the above embodiment, in the guide rail 50, the peripheral wall 55 of the movable base 47 constituting the lower surface 42b of the movable step 42 forms the side wall 57 on the outer side in the vehicle width direction, and the rail members 53, 54 facing the peripheral wall 55 in the vehicle width direction form the side wall 58 on the inner side in the vehicle width direction. However, the present disclosure is not limited to this example, and two independent wall members formed as parts separate from the movable step 42 may be fixed to the lower surface 42b of the movable step 42 to form the side walls 57, 58 of the guide rail 50. Alternatively, for example, a rail member with a substantially square-U-shaped cross-section opening downward may be fixed to the lower surface 42*b* of the movable step 42 to form the guide rail 50. In addition, the guide rail 50 may be integrally formed in the movable step 42.

In the above embodiment, the closing-side free running zone αc constitutes the non-sliding-contact zone γ in which the guide roller 60 moving inside the guide rail 50 in the vehicle front-rear direction moves in the vehicle width direction while shifting in the rail width direction of the guide rail 50 without coming into sliding contact with the side walls 57, 58. The opening-side free running zone αo constitutes the parallel zone ε in which the side walls 57, 58 of the guide rail 50 extend parallel to the track of movement Qr of the guide roller 60. However, the present disclosure is not limited to this example, and the closing-side free running zone αc may constitute the parallel zone ε. The opening-side free running zone αo may constitute the non-sliding-contact zone γ.

In the above embodiment, in the non-sliding-contact zone γ, the gradient of change θ1 of the side wall 57 on the outer side in the vehicle width direction is set to be smaller than the gradient of change θr set for the track of movement Qr of the guide roller 60, and the gradient of change θ2 of the side wall 58 on the inner side in the vehicle width direction is set to be larger than the gradient of change θr. However, the present disclosure is not limited to this example, and for example, simply a larger rail width may be set, as long as the guide roller 60 moving inside the guide rail 50 in the vehicle front-rear direction can move in the vehicle width direction while shifting in the rail width direction of the guide rail 50 without coming into sliding contact with the side walls 57, 58.

Figure 40:
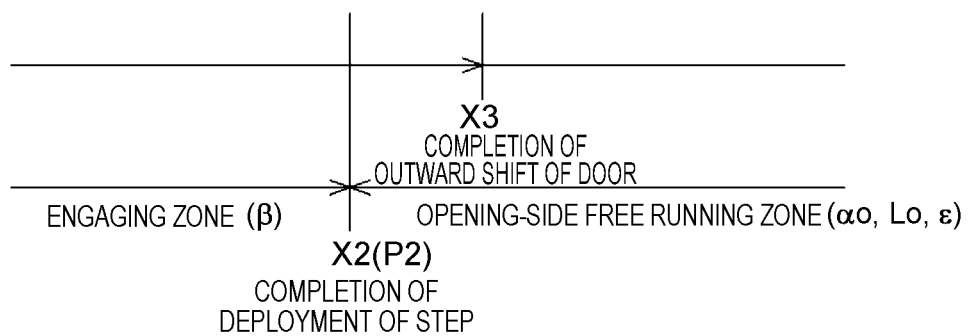
FIG. 40 is a view illustrating another example of movement of the movable step in the vehicle width direction in conjunction with opening and closing of the sliding door.

In the above embodiment, during opening of the sliding door 4, the movable step 42 reaches the deployed position P2 at the same time as shift of the sliding door 4 toward the outer side in the vehicle width direction is completed. However, the present disclosure is not limited to this example, and as shown in FIG. 40, during opening of the sliding door 4, the movable step 42 may reach the deployed position P2 before shift of the sliding door 4 toward the outer side in the vehicle width direction is completed.

An occupant of the vehicle 1 may start to get in or out of the vehicle 1 when shift of the sliding door 4 toward the outer side in the vehicle width direction is completed, even if the sliding door 4 is still opening. In the above configuration, the movable step 42 has already reached the deployed position P2 by that time. This can reduce the likelihood that an occupant may place his or her foot on the movable step 42 that is moving outward in the vehicle width direction.

Further, the moving position X3 at which the guide roller 60 is located when shift of the sliding door 4 toward the outer side in the vehicle width direction is completed is already in the opening-side moving region Lo, i.e., the opening-side free running zone ow set for the guide rail. Thus, even when an occupant of the vehicle 1 places his or her foot on the movable step 42 before shift of the sliding door 4 toward the outer side in the vehicle width direction is completed, the movable step 42 is less likely to put a load on the sliding door 4.

In the above embodiment, the sub-step 43 is formed by turnably coupling the step part 72 forming the step surface S2 to the base part 71 that is fixed to the vehicle body 2. However, the present disclosure is not limited to this example, and the base part 71 and the step part 72 may be fixed to each other in a substantially L-shape.

In the above embodiment, the base part 71 and the step part 72 of the sub-step 43 are formed by laying the resin covers 77, 78 on the base members 75, 76, but instead both or one of the base part 71 and the step part 72 may be composed of a single part. Alternatively, the base part 71 and the step part 72 may be integrally formed.

In the above embodiment, in the sub-step 43, the projection 79 provided on the resin cover 78 so as to protrude toward the side of the lower surface 72*b* comes into sliding contact with the upper surface 42*a* of the movable step 42 at the leading end portion of the step part 72. However, the present disclosure is not limited to this example, and the portion at which the step part 72 of the sub-step 43 comes into sliding contact with the upper surface 42*a* of the movable step 42 need not be necessarily the leading end portion and may instead be a portion on the base end side.

The step part 72 of the sub-step 43 and the upper surface 42*a* of the movable step 42 need not necessarily directly come into sliding contact with each other, and may instead, for example, come into sliding contact with each other through an attached part having elasticity, such as a brush or a lip seal. Alternatively, a gap may be left between the lower surface 72*b* of the step part 72 on the side of the sub-step 43 and the upper surface 42*a* of the movable step 42, without these surfaces coming into sliding contact with each other.

Figure 41:
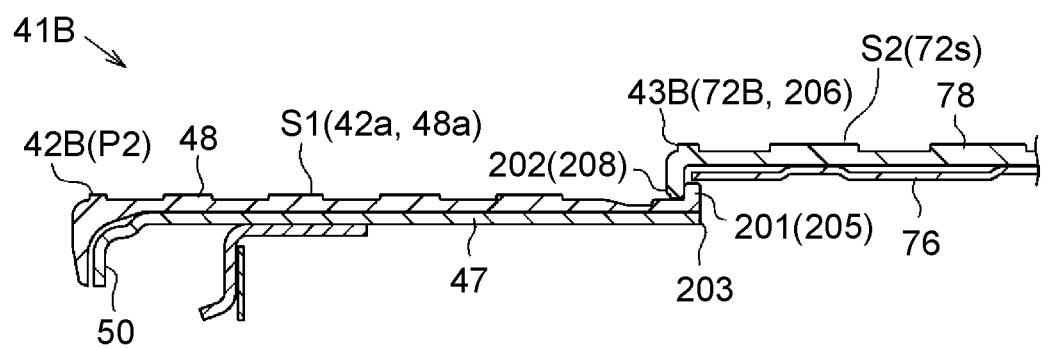
FIG. 41 is a sectional view of a movable step and a sub-step showing another example of a stopper structure.

As in a step device 41B shown in FIG. 41, movement of a movable step 42B toward the outer side in the vehicle width direction may be restricted as a first engaging part 201 provided on the movable step 42B and a second engaging part 202 provided on a sub-step 43B engage with each other when the movable step 42B moves to the deployed position P2.

For example, in the step device 41B, an engaging projection 205 protruding toward the upper side of the movable step 42B is provided at a base end portion 203 of the movable step 42B. An engaging projection 208 protruding toward the lower side of a step part 72B of the sub-step 43B is provided at a leading end portion 206 of the step part 72B. In the step device 41B, the engaging projection 205 engages with the engaging projection 208 on the side of the sub-step 43B when the movable step 42B moves toward the outer side in the vehicle width direction and reaches the deployed position P2. In the step device 41B, the engaging projections 205, 208 serve as the first engaging part 201 and the second engaging part 202 to restrict movement of the movable step 42B toward the outer side in the vehicle width direction.

This configuration can maintain a constant positional relationship between the movable step 42B and the sub-step 43B when the movable step 42B is in the deployed position P2. This makes it possible to further enhance the unity of the step surface S1 of the movable step 42 and the step surface S2 of the sub-step 43 by, for example, connecting the step surfaces S1, S2 of the movable step 42 and the sub-step 43 to each other so as to obscure the border between the decorative shapes thereof.

The shapes of the first engaging part 201 and the second engaging part 202 may be arbitrarily changed. For example, one of the first engaging part 201 and the second engaging part 202 may have a recessed shape. Further, the position at which the first engaging part 201 is formed need not necessarily be the base end portion 203 of the movable step 42B. The position at which the second engaging part 202 is formed need not necessarily be the leading end portion 206 of the step part 72B, either.

In the above embodiment, the pressure bearing members 100 are made of a resin having a shock absorbing property and a self-lubricating property. However, the material of the pressure bearing members 100 may be arbitrarily changed. As long as the pressure bearing members 100 can come into sliding contact with the support arms 44 and bear the load thereof, the pressure bearing member 101 provided on the support bracket 45 and the pressure bearing member 111 on the side of the movable step 42 provided on the holding member 110 may be made of different materials. For example, one of the pressure bearing members 101, 111 may be made of resin and the other may be made of metal. The possibility of forming both the pressure bearing members 101, 111 using other materials than resin is not eliminated.

The shape of the pressure bearing members 100 may be arbitrarily changed. For example, the pressure bearing member 111 on the side of the movable step 42 may have a form of a substantially arc-shaped flat plate, like the pressure bearing member 101 on the side of the support bracket 45. Further, at least one of the pressure bearing members 101, 111 may form a sliding contact surface of other shape than an arc shape that extends in a direction intersecting the support arm 44. The pressure bearing member 101 on the side of the support bracket 45 may have a form of a substantially rectangular flat plate, like the pressure bearing member 111 on the side of the movable step 42.

The number and arrangement of the pressure bearing members 100 may also be arbitrarily changed. For example, only one of the pressure bearing member 101 on the side of the support bracket 45 and the pressure bearing member 111 on the side of the movable step 42 may be provided. In the above embodiment, only the main arms 81 are each provided with the holding member 110 and the pressure bearing member 111. However, the sub-arm 82 may also be provided with a similar holding member 110 and pressure bearing member 111. Further, only the sub-arm 82, or the sub-arm 82 and one of the main arms 81 may be provided with the holding member 110 and the pressure bearing member 111. In the above embodiment, all the support arms 44 are provided with the pressure bearing member 101 on the side of the support bracket 45. However, the pressure bearing member 101 on the side of the support bracket 45 may be selectively provided; for example, only the main arms 81 may be each provided with the pressure bearing member 101 on the support bracket 45.

In the above embodiment, the ridges 118 provided on the lower surface 48*b* of the resin cover 48 protrude toward the lower surface 42*b* of the movable step 42 through the holes 119 provided in the movable base 47. However, the present disclosure is not limited to this example, and the structure and material of the ridges 118 may be arbitrarily changed. For example, the ridges 118 may be made of metal. The ridges 118 may be provided on the member forming the lower surface 42*b* of the movable step 42.

In the above embodiment, the step device 41 includes, as the support arms 44, two main arms 81 and one sub-arm 82 provided between the main arms 81. However, the present disclosure is not limited to this example, and the number and arrangement of the sub-arm 82 may be arbitrarily changed. For example, two or more sub-arms 82 may be provided. A sub-arm 82 may be provided on the vehicle front side or the vehicle rear side of the main arms 81. Alternatively, the sub-arm 82 may be omitted and the movable step 42 may be supported by two main arms 81.

A configuration may be adopted in which the support arms 44 that are turnably coupled to both the vehicle body 2 and the movable step 42 are used in combination with other support structure, for example, a rail-and-slider.

In the above embodiment, the step device 41 includes, as the stoppers 120, the first stopper 121 that restricts turning of the front main arm 81*f* by coming into contact with the front main arm 81*f* when the movable step 42 reaches the retracted position P1, and the second stopper 122 that restricts turning of the rear main arm 81*r* by coming into contact with the rear main arm 81*r* when the movable step 42 reaches the deployed position P2. However, the present disclosure is not limited to this example, and the configuration and arrangement of the stoppers 120 may be arbitrarily changed as long as the stoppers 120 restrict the movable range of the movable step 42 by coming into contact with the support arms 44.

The material of the cover member 130 may be arbitrarily changed. The material may be resin or metal. In the above embodiment, the cover member 130 includes the bottom wall 131 that is disposed under the support arms 44 and the peripheral wall 132 that is provided at the edges of the bottom wall 131. However, the shape of the cover member 130 may be arbitrarily changed. For example, the cover member 130 may have a dome shape or the like in which there is no distinction between the bottom wall 131 and the peripheral wall 132. The seal member 135 interposed between the vehicle body 2 and the peripheral wall 132 may be omitted. The possibility of leaving a gap between the cover member 130 and the lower surface 2*b* of the vehicle body 2 is not eliminated.

In the above embodiment, the cover member 130 forms the housing space 133 together with the lower surface 2*b* of the vehicle body 2 and the lower surface 43*b* of the sub-step 43. Alternatively, the cover member 130 may form the housing space 133 together with only the lower surface 2*b* of the vehicle body 2.

In the state where the movable step 42 is in the retracted position P1, at least part of the step surface S1 may be exposed toward the upper side. The lower surface 42*b* of the movable step 42 may be partially exposed toward the lower side of the cover member 130.

In the above embodiment, the helical torsion spring 170 is used as the urging member that applies an urging force in the direction of lifting the guide roller 60 to the arm member 62. However, other elastic member, such as an extension spring or a compression spring, may be used as the urging member.

In the above embodiment, the guide rail 50 has, as the notches 180, the notch 181 provided at the longitudinal end portion 50*r* on the vehicle rear side and the notch 182 formed at the corner 70*c* farthest on the vehicle rear side in the curved portion 70 provided at the longitudinal end portion 50*f* on the vehicle front side. However, the present disclosure is not limited to this example, and the number and arrangement of the notches 180 may be arbitrarily changed. For example, there may be only one notch 180 and that notch 180 may be the notch 181 at the longitudinal end portion 50*r* on the vehicle rear side. Alternatively, three or more notches 180 may be provided apart from one another in the longitudinal direction of the guide rail 50.

In the above embodiment, the fall prevention flange 59 is provided at the lower end portion of the side wall 58 on the inner side in the vehicle width direction. However, the fall prevention flange 59 may instead be provided at the lower end portion of the side wall 57 on the outer side in the vehicle width direction.

In the above embodiment, the retaining member 190 has the hook-shaped engaging projection 191 and is coupled to the bottom wall 131 of the cover member 130. Turning the retaining member 190 around the support shaft 190*x* can switch between the used state where the engaging projection 191 does not engage with the movable step 42 and the retained state where the engaging projection 191 engages with the movable step 42. However, the present disclosure is not limited to this example, and the structure of retaining the movable step 42 by the retaining member 190 may be arbitrarily changed. The position at which the retaining member 190 is disposed may also be arbitrarily changed, for example, to the sub-step 43 or the support bracket 45.

A technical idea that can be grasped from the above embodiment and modified examples is as follows: A step device for a vehicle characterized in that a movable step includes a movable base to which a support arm is coupled, and a resin cover that is fixed to the movable base to be a step surface, and in that a ridge is provided on a lower surface of the resin cover and protrudes toward a lower surface side of the movable step through a hole provided in the movable base.

This simple configuration makes it possible to impart a shock absorbing property and a self-lubricating property to the ridge while securing the strength of the movable base. Thus, smoother turning of the support arm can be ensured.

What is claimed is:

1. A step device for a vehicle, the step device comprising:
a movable step supported under a door opening;
a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door;
a support arm that has a first pivot-joint point relative to a vehicle body and a second pivot-joint point relative to the movable step, and supports the movable step toward an upper side; and
a pressure bearing member that is provided at a position between the first pivot-joint point and the second pivot-joint point and bears a load of the support arm by coining into sliding contact with the support arm, wherein:
the support arm has a support bracket that is fixed to the vehicle body to form the first pivot-joint point, and
the pressure bearing member is provided on the support bracket.

2. The step device according to claim 1, wherein the pressure bearing member has a sliding contact surface that extends in a direction intersecting the support arm.

3. A step device for a vehicle, the step device comprising:
a movable step supported under a door opening;
a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door;
a support arm that has a first pivot-joint point relative to a vehicle body and a second pivot-joint point relative to the movable step, and supports the movable step toward an upper side;
a pressure bearing member that is provided at a position between the first pivot-joint point and the second pivot-joint point and bears a load of the support arm by coming into sliding contact with the support arm; and
a holding member that is fixed to the movable step so as to hold, together with the movable step, the support arm at the second pivot-joint point, wherein the pressure bearing member is provided on the holding member.

4. A step device for a vehicle, the step device comprising:
a movable step supported under a door opening;
a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door;
a support arm that has a first pivot-joint point relative to a vehicle body and a second pivot-joint point relative to the movable step, and supports the movable step toward an upper side; and
a pressure bearing member that is provided at a position between the first pivot-joint point and the second pivot joint point and bears a load of the support arm by coming into sliding contact with the support arm,
wherein the pressure bearing member is made of a resin having a shock absorbing property and a self-lubricating property.

5. A step device for a vehicle, the step device comprising:
a movable step supported under a door opening;
a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door;
a support arm that has a first pivot-joint point relative to a vehicle body and a second pivot-joint point relative to the movable step, and supports the movable step toward an upper side; and
a pressure bearing member that is provided at a position between the first pivot-joint point and the second pivot-joint point and bears a load of the support arm by coming into sliding contact with the support arm,
wherein a ridge that extends in a direction intersecting the support arm and comes into sliding contact with the support arm is provided on a lower surface of the movable step.

6. The step device according to claim 5, wherein:
the movable step includes a movable base to which the support arm is coupled, and a resin cover that is fixed to the movable base to be a step surface; and
the ridge is provided on a lower surface of the resin cover and protrudes toward a lower surface side of the movable step through a hole provided in the movable base.

7. A step device for a vehicle, the step device comprising:
a movable step supported under a door opening;
a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door;
a support arm that has a first pivot-joint point relative to a vehicle body and a second pivot-joint point relative to the movable step, and supports the movable step toward an upper side; and
a pressure bearing member that is provided at a position between the first pivot-joint point and the second pivot joint point and bears a load of the support arm by coming into sliding contact with the support arm,
wherein the support arm includes two main arms that are provided at positions apart from each other in the vehicle front-rear direction, and a sub-arm that has a joint at which the sub-arm is bendable and that is provided at a position apart from each of the main arms.

8. The step device according to claim 7, wherein the sub-arm is provided between the main arms.

9. A step device for a vehicle, the step device comprising:
a movable step supported under a door opening;
a coupling member that, in a state of being supported by a sliding door that opens and closes in a vehicle front-rear direction with a shifting zone in a vehicle width direction, engages with the movable step to move the movable step in the vehicle width direction in conjunction with opening and closing of the sliding door;
a support arm that has a first pivot-joint point relative to a vehicle body and a second pivot-joint point relative to the movable step, and supports the movable step toward an upper side; and
a pressure bearing member that is provided at a position between the first pivot-joint point and the second pivot-joint point and bears a load of the support arm by coming into sliding contact with the support arm; and
a stopper that restricts a movable range of the movable step by coming into contact with the support arm.

* * * * *